(12) United States Patent
Portisch et al.

(10) Patent No.: US 11,593,392 B2
(45) Date of Patent: Feb. 28, 2023

(54) TRANSFORMATION RULE GENERATION AND VALIDATION

(71) Applicant: SAP SE, Walldorf (DE)

(72) Inventors: Jan Portisch, Bruchsal (DE); Ronald Boehle, Dielheim (DE); Sandra Bracholdt, Dielheim (DE); Volker Saggau, Bensheim (DE)

(73) Assignee: SAP SE, Walldorf (DE)

( * ) Notice: Subject to any disclaimer, the term of this patent is extended or adjusted under 35 U.S.C. 154(b) by 229 days.

(21) Appl. No.: 16/776,407

(22) Filed: Jan. 29, 2020

(65) Prior Publication Data

US 2021/0232591 A1   Jul. 29, 2021

(51) Int. Cl.
| | |
|---|---|
| *G06F 7/02* | (2006.01) |
| *G06F 16/00* | (2019.01) |
| *G06F 16/25* | (2019.01) |
| *G06F 16/2455* | (2019.01) |
| *G06N 20/00* | (2019.01) |
| *G06F 16/9035* | (2019.01) |
| *G06F 16/28* | (2019.01) |

(52) U.S. Cl.
CPC ...... *G06F 16/254* (2019.01); *G06F 16/24564* (2019.01); *G06F 16/285* (2019.01); *G06F 16/9035* (2019.01); *G06N 20/00* (2019.01)

(58) Field of Classification Search
CPC .. G06F 16/254; G06F 16/285; G06F 16/9035; G06F 16/24564; G06F 16/20; G06N 20/00
See application file for complete search history.

(56) References Cited

U.S. PATENT DOCUMENTS

| | | | |
|---|---|---|---|
| 8,370,233 B2 | 2/2013 | Kaisemayr et al. | |
| 9,558,260 B1 * | 1/2017 | Halberstadt | G06F 16/24564 |
| 10,437,847 B1 * | 10/2019 | Silberstein | G06F 16/26 |
| 2009/0248586 A1 | 10/2009 | Kaisemayr et al. | |

(Continued)

OTHER PUBLICATIONS

Kantaricoglu, Murat et al, "Classifier evaluation and attribute selection against adversaries," Data Mining and Knowledge Discovery, vol. 22 pp. 291-335, Jan. 2011, from https://doi.org/10.1007/s10618-010-0197-3. (Year: 2011).*

(Continued)

*Primary Examiner* — Bruce M Moser
(74) *Attorney, Agent, or Firm* — Klarquist Sparkman, LLP

(57) ABSTRACT

Transformation rule generation and validation functionality is provided herein. Transformation rules can be generated for one or more mappings in an alignment between a source database and a target database. The transformation rules can transform instance data from the source data model to a form matching the target data model. One or more transformation rules can be generated for a mapping between fields in a source database and a field in a target database. The transformation rules can be generated based on one or more source fields and a target field of a mapping, and one or more identified functions. Evaluating the transformation rules can include generating test data based on the transformation rules applied to instance data from the source database. The test data can be evaluated against instance data from the target database. The transformation rules and the evaluation results can be provided in a user interface.

17 Claims, 14 Drawing Sheets

(56) References Cited

U.S. PATENT DOCUMENTS

| | | | |
|---|---|---|---|
| 2009/0327208 A1* | 12/2009 | Bittner | G06F 16/24564 706/61 |
| 2015/0142719 A1* | 5/2015 | Behuria | G06F 16/275 706/48 |
| 2016/0063209 A1* | 3/2016 | Malaviya | G16H 50/50 706/12 |
| 2016/0357787 A1 | 12/2016 | Kolata et al. | |
| 2019/0057137 A1* | 2/2019 | Bradham | G06F 16/254 |
| 2019/0286620 A1* | 9/2019 | Al-Haimi | G06F 16/211 |
| 2020/0250260 A1 | 8/2020 | Portisch | |
| 2020/0349130 A1 | 11/2020 | Bracholdt | |

OTHER PUBLICATIONS

El-Sappagh, Shaker H. el Ali et al, "A proposed model for data warehouse ETL processes," Journal of King Saud University—Computer and Information Sciences, Jul. 2011 vol. 23 pp. 91-104, from https://doi.org/10.1016/j.jksuci.2011.05.005 (Year: 2011).*

"Binary tree," Wikipedia, available at: https://en.wikipedia.org/wiki/Binary_tree, 7 pages, page last updated Jul. 2, 2019, retrieved on Aug. 20, 2019.

Blumöhr et al., "Variant Configuration with SAP," retrieved from https://www.sap-press.com/variant-configuration-with-sap_2889/ on or before Jan. 2018, 52 pp.

Gulwani, S. et al., "Program Analysis as Constraint Solving," retrieved from https://www.microsoft.com/en-us/research/wp-content/uploads/2016/12/pldi08_cs.pdf on or before Jan. 2018, 12 pp.

Hauptmann, "Introduction to Variant Configuration with an example model," retrieved from https://wiki.scn.sap.com/wiki/display/PLM/Introduction+to+Variant+Configuration+with+an+example+model on or before Jan. 2018, 11 pp.

Kumbum, R., "Variant Configuration," retrieved from https://www.slideshare.net/KUMBUM/sap-variant-configuration-34736665 on or before Jan. 2018, 84 pp.

Lecoutre, C. et al., "Improving the lower bound of simple tabular reduction," retrieved from https://link.springer.com/article/10.1007/s10601-014-9171-9 on or before Jan. 2018, 9 pp.

Lecoutre, C., "STR2: optimized simple tabular reduction for table constraints," retrieved from https://link.springer.com/article/10.1007/sl0601-011-9107-6 on or before Jan. 2018, 31 pp.

Li, H. et al., "Making Simple Tabular Reduction Works on Negative Table Constraints," retrieved from https://pdfs.semanticscholar.org/8057/f234d2flb3591cffeb8d651e15e1043fd78d.pdf on or before Jan. 2018, 2 pp.

Marriott, K. et al., "Negative Boolean constraints," retrieved from https://www.sciencedirect.corn/science/article/pii/030439759500209X on or before Jan. 2018, 16 pp.

"Probability Tree Diagrams," retrieved from https://www.mathsisfun.com/data/probability-tree-diagrams.html on or before Jun. 20, 2019, 5 pp.

"Scratch (programming language)," Wikipedia, visited Jan. 31, 2019, 13 pages.

Ullmann, J., "Partition search for non-binary constraint satisfaction," retrieved from http://cse.unl.edu/~choueiry/Documents/Ullmann2007-GAC.pdf on or before Jan. 2018, 40 pp.

Wallace, M., "Practical Applications of Constraint Programming," retrieved from https://link.springer.com/article/10.1007/BF00143881 on or before Jan. 2018, 30 pp.

* cited by examiner

TRANSFORMATION RULE GENERATION AND VALIDATION

BACKGROUND

The amount of data in database and enterprise systems continues to increase at a high pace. In practice, such data is often stored in data silos that prevent full utilization. The different data silos may be matched together, identifying equivalent data or schemas between the data silos, which may allow greater integration or use of the data. However, matching data silo schemas or data silo data often requires the cumbersome, manual process of rule building by domain experts or consultants, so it is very labor-intensive and costly. Thus, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Transformation rules can be generated for one or more mappings in an alignment between a source database and a target database. The transformation rules can transform instance data from the source data model to a form matching the target data model. One or more transformation rules can be generated for a mapping between fields in a source database and a field in a target database. The transformation rules can be generated based on one or more source fields and a target field of a mapping, and one or more identified functions. Evaluating the transformation rules can include generating test data based on the transformation rules applied to instance data from the source database. The test data can be evaluated against instance data from the target database. The transformation rules and the evaluation results can be provided in a user interface For example, operations can be performed comprising: receiving a mapping comprising one or more source fields in a source database and a target field in a target database, identifying one or more transformation functions, generating one or more transformation rules based on the one or more source fields, the target field, and the one or more transformation functions, and providing the one or more generated transformation rules.

The foregoing and other objects, features, and advantages of the invention will become more apparent from the following detailed description, which proceeds with reference to the accompanying figures.

DETAILED DESCRIPTION

Example 1—Overview

Figure 1A:
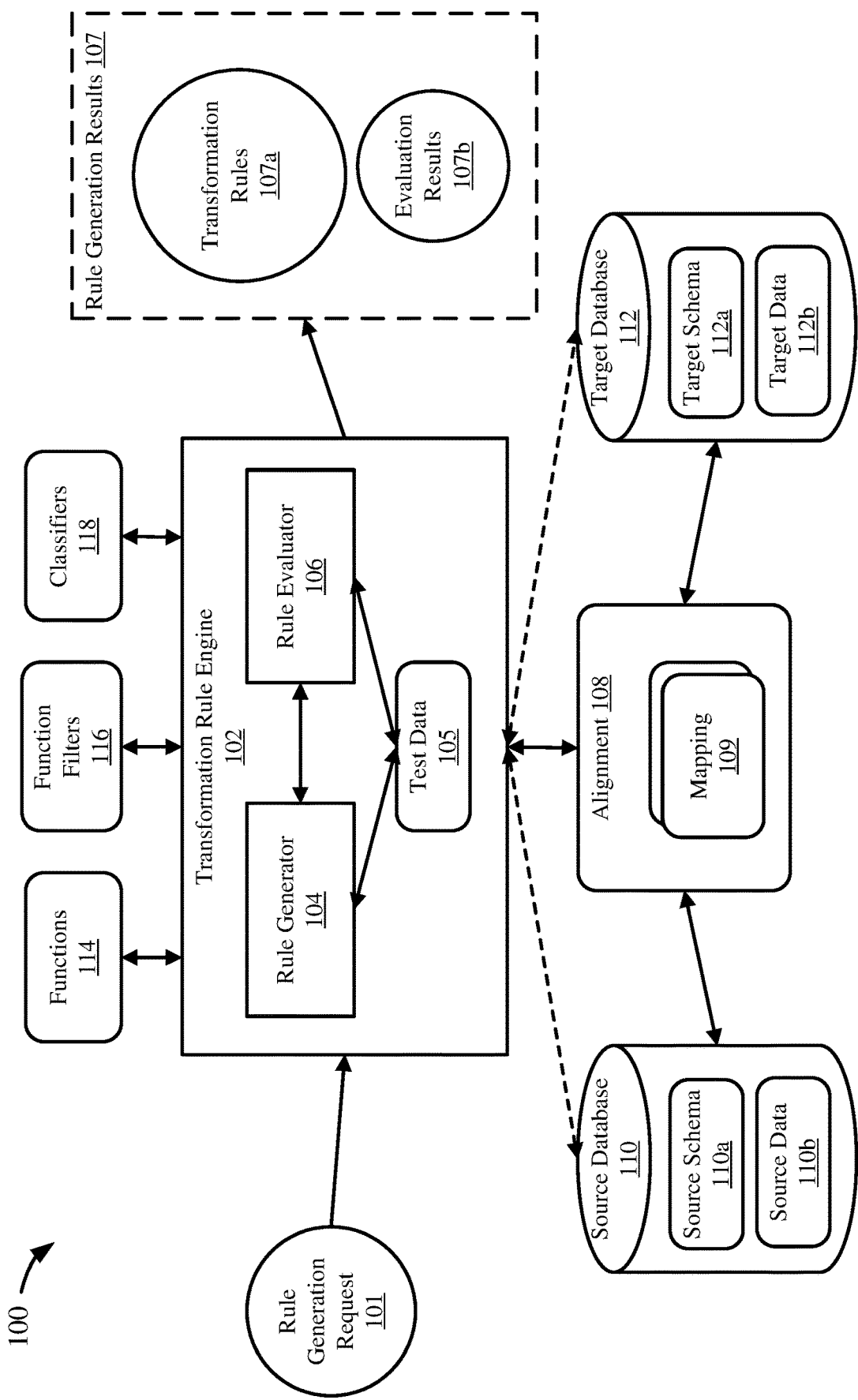
FIG. 1A is a block diagram of an example system implementing automated or semi-automated transformation rule generation and evaluation.

The ever-increasing amount of incoming data and transformation of the enterprise into a data-driven world creates many difficulties as data is indeed accumulated, but not always in an organized or arranged manner. Often, data is split into different operational and analytical systems, and stored in data silos, which can prevent effective use of the full potential of the data. Essentially data segregation into data silos leads to semantic and technological heterogeneity, resulting in analytical barriers. Overcoming the heterogeneity between data silos may be accomplished by finding an alignment between the disparate data schemas and defining rules which can specify how the data is translated between the disparate schemas, such as by the process of schema matching or aligning, and data integration.

Data integration can include schema matching and data translation. Generally, schema matching includes identifying which fields or other data structures between two schemas represent the same or equivalent semantic content. Data translation generally specifies how the data in these fields or structures is translated (e.g. moved, written, transformed, or the like) between the two schemas. For example, schema1.field1 and schema1.field2 may be mapped to schema2.field3, e.g. (schema1.field1, schema1.field2)→schema2.field3. The data translation may be defined by a transformation rule, which can include logic statements and/or functions or other operations to transform the data from the first schema (e.g. source schema) to the second schema (e.g. target schema). For example: 1) IF(schema1.field1>1000 AND schema1.field1<10000 AND schema1.field2>100) THEN schema2.field3="BASIC"; or 2) concat(schema1.field1, schema1.field2):=schema2.field3.

Within this schema matching and data integration process, transformation rules can be created that describe how the data is transformed from one schema into the other, and/or provide the functionality, or describe the operations, to transform data from one schema to another. Similarly, such transformation rules may also be developed for triggering system or software functionality, or directing a process flow or work flow in a computing system. Generally, rule development is a manual process, with little to no technical support and lacking intelligent functionality such as automatic rule generation or rule validation.

There are many scenarios where generating transformation rules for mapping data transformations, and evaluating or validating such rules, can be helpful. For example, a new data model can be obtained, and specialists can map data into the new data model from an old data model. The specialists may align the old and new data models, and create field mappings between the data entities in the old and new data models. Next, the specialist may analyze the instance data and data definitions to understand how the data should be transformed for each mapping between the data models. Generally, the specialist performs such analysis for each mapping by hand, such as in a text editor or similar environment, with no specialized or intelligent support for generating the transformation rules between data elements mapped between the data models. This can take extensive time and effort, even for a specialist that originally created the mappings (which may have been done weeks or months before). Thus, transformation rule development can be a slow and expensive process, and may be impracticable or cost-prohibitive for very large data models.

As another example, a team may have spent significant time developing transformation rules for mappings between two data models based on a detailed analysis of instance data from the two data models. A specialist may receive word, though, that the transformation results in practice appear incorrect. The specialist may begin reviewing the original data, the transformed data, the transformation rule(s), and the data models. This analytical process performed by the specialist is generally very complex and can take significant time, even for a single transformation rule, and often many such rules may require validation analysis or review. Thus, transformation rule validation can be a slow and expensive process, and may be prohibitively complex with sufficiently large data sets (by either time, cost, or mathematical complexity).

Automatic transformation rule development functionality as described herein can generally alleviate these issues, in some cases removing them entirely, and generally improves system performance and result accuracy. Automatic or semi-automatic rule development can include transformation rule generation and rule evaluation or validation, as described herein, which generally provides proposed transformation rules and, in some cases, rule rankings or other rule scoring indicators. Such automatic transformation rule development functionality can assist transformation rule development for mappings between data schemas, improving the process of transformation rule development and the quality of the transformation rules developed.

For example, transformation rule proposals can save time as a user does not need to recreate a rule but can choose from a set of options automatically generated and validated against instance data, which can speed transformation rule development (especially for complex rules). Transformation rule proposals can also include validation (e.g. evaluation, classification, and/or scoring) metadata about the rules, which can make selecting an effective or appropriate rule easier and faster. Such evaluation results metadata can improve quality of transformation rule development as well as rule development efficiency.

The transformation rule generation and rule evaluation functionality, as described herein, can be integrated with other rule writing or rule persistence technology. Rule writing functionality can include the rule language technologies disclosed in U.S. patent application Ser. No. 16/265,063, titled "LOGICAL, RECURSIVE DEFINITION OF DATA TRANSFORMATIONS," filed Feb. 1, 2019, having inventors Sandra Bracholdt, Joachim Gross, and Jan Portisch, and incorporated herein by reference, which can be used as a rule-writing system or language for generation, development, storage, or maintenance of logic statements or transformation rules as described herein. Further, rules for mapping or data transformations, such as between data models or schemas, can utilize the metastructure schema technologies disclosed in U.S. patent application Ser. No. 16/399,533, titled "MATCHING METASTRUCTURE FOR DATA MODELING," filed Apr. 30, 2019, having inventors Sandra Bracholdt, Joachim Gross, Volker Saggau, and Jan Portisch, and incorporated herein by reference, which can be used as data model representations for analysis, storage, development, or maintenance of logic statements or transformation rules as described herein.

Transformation rule generation and rule evaluation functionality can be provided in data modelling software, integrated development environments (IDEs), data management software, data integration software, ERP software, or other rule-generation or rule-persistence software systems. Examples of such tools are: SAP FSDP™ technology, SAP FSDM™ technology, SAP PowerDesigner™ technology, SAP Enterprise Architect™ technology, SAP HANA Rules Framework™ technology, HANA Native Data Warehouse™ technology, all by SAP SE of Walldorf, Germany.

Example 2—Example System that Generates Transformation Rules for Use in Data Model Alignments and Evaluates the Generated Transformation Rules FIG. 1A is a block diagram of an example system 100 implementing automated or semi-automated transformation rule generation and evaluation. A transformation rule engine 102 can automatically or semi-automatically generate rule generation results 107, such as transformation rules 107a and/or transformation rule evaluation results 107b. The transformation rule engine 102 can provide transformation rule generation and/or evaluation functionality directly, or it may be integrated in an application, such as an integrated development environment (IDE) or with a user interface.

The transformation rule engine 102 can receive a rule generation request 101. The request 101 can be a function call or can be made through an API or other interface of the transformation rule engine 102. In some embodiments, the request 101 can be a trigger which initiates functionality in the transformation rule engine 102, such as based on an input or a context change in an application or user interface.

The rule generation request 101 can include one or more variables for generating the requested transformation rule generation results 107. For example, the request 101 can include an alignment or an identifier for an alignment (e.g. 108), or one or more mappings or identifiers for mappings (e.g. 109). The request 101 can further include an identifier for a source database (e.g. 110), and/or a source schema or identifier for a source schema (e.g. 110a), and/or source instance data or references to source instance data (e.g. 110b). The request 101 can further include an identifier for a target database (e.g. 112), and/or a target schema or identifier for a target schema (e.g. 112a), and/or target instance data or references to target instance data (e.g. 112b). In some embodiments, the transformation rule engine 102 can obtain information about the source database 110 and/or the target database 112 (e.g. identifiers, locations, etc.) based on or directly from the alignment 108.

The request 101 can further include references or identifiers to one or more available functions, or a set of functions, 114. The request 101 can further include references or identifiers to one or more available function filters, or a set of function filters, 116. The request 101 can further include references or identifiers to one or more classifiers, or a set of classifiers, 118. In some embodiments, the transformation rule engine 102 can include or have access to (e.g. in a registry or configuration file) access information for the available functions 114, the function filters 116, and/or the classifiers 118.

Generally, identifiers or memory locations can be provided for the data inputs in the request 101. In some embodiments, such as when the request 101 is a trigger, the alignment 108 and/or one or more mappings 109 can be available for the transformation rule engine 102 as part of the system 100 context, rather than being provided as part of the request 101. For example, in an IDE, the transformation rule engine 102 can be activated by a user saving an alignment, which can trigger the transformation rule engine to begin automatically generating one or more rule generation results for the alignment based on the alignment and/or other information in the current context of the IDE, such as available functions 114, in the IDE.

The rule development request 101 can also include one or more configurable configuration settings or options, such as a value indicating a preferred number of generated transformation rules (e.g. 107a), or a threshold score for the evaluation results (e.g. 107b) of the generated transformation rules.

The transformation rule engine 102 can access an alignment 108 for generating transformation rules 107a as described herein. Generally, the alignment 108 aligns a source schema 110a of a source database 110 with a target schema 112a of a target database 112. The alignment 108 can include one or more mappings 109, which can indicate specific fields or other data objects in the source schema 110a and which specific fields or other data objects in the target schema 112a they match (e.g. store the same or similar data). The transformation rule engine 102 can generate transformation rules 107a for one or more of the mappings 109 in the alignment 108. Generally, the transformation rules 107a include logic which can transform source data 110b into instance data, for a given mapping 109, matching the target schema 112a. In this way, the source data 110b can be transferred and stored in the target database 112 (e.g. the source data can be transformed into target data 112b).

The transformation rule engine 102 can access a source database 110. The source database 110 can include a source schema 110a (e.g. data model) and source instance data 110b (e.g. records). The transformation rule engine 102 can access a target database 112. The target database 112 can include a target schema 112a (e.g. data model) and target instance data 112b (e.g. records). Generally, the source schema 110a and the target schema 112a are different, which generally prevents source data 110b from being copied directly to the target database and stored (e.g. as additions to target data 112b). The transformation rule engine 102 can generate transformation rules 107a for transforming source data 110b to match the target schema 112a such that the source data can be stored in the target database 112. The transformation rule engine 102 can obtain information regarding the data to be translated (e.g. source data 110b), such as which specific fields, field types, data formats, and the like, from the alignment 108, the mappings 109, the source database 110 (e.g. the source schema 110a), and/or the target database 112 (e.g. the target schema 112a).

The transformation rule engine 102 can access a set of available functions 114. The available functions 114 can be a list of functions available for transforming data, and can be included in the generated transformation rules 107a. The available functions 114 can be obtained from a database having records representing the available functions, such as including identifiers and/or a location or manner to access the functions (e.g. a location or a service providing the function).

The transformation rule engine 102 can access a set of function filters 116. The function filters 116 can be a list of pre-generated, standard, or customized filters available for filtering the set of available functions 114. The function filters 116 can be obtained from a database having records representing the function filters, such as including identifiers and/or one or more criteria for filtering the available functions 114.

The function filters 116 can be applied to the set of available functions 114 to change or reduce the set of available functions when generating the transformation rules 107a. In this way, the functions 114 used in the transformation rules 107a can be customized or targeted for preferable (e.g. more accurate or more efficient) functions for a given mapping for which a given transformation rule is generated.

The transformation rule engine 102 can access a set of classifiers 118. The classifiers 118 can be a list of criteria, parameters, or analytical functions for classes available for use in evaluating the transformation rules 107a. In some embodiments, the classifiers can be machine-learning algorithms which can be trained to compare or classify data sets. The classifiers 118 can be obtained from a database having records representing the classifiers, such as including identifiers and/or criteria defining the class(es). The classifiers 118 can be used to classify, rank, score, or otherwise evaluate the transformation rules 107a, and to generate the evaluation results 107b.

The transformation rule engine 102 can generate the rule generation results 107, which include the transformation rules 107a and the evaluation results 107b. The evaluation results 107b can be associated with the transformation rules 107a, and generally include information, such as a score or rank, regarding the accuracy or effectiveness of the transformation rules. For example, each transformation rule 107a can have a rank or score, and the set of ranks or scores can be the evaluation results 107b.

Generally, the transformation rules 107a can include rules which transform source instance data 110b into a format which can be stored in the target database 112 (e.g. as additional records in the target instance data 112b) based on the alignment 108 between the source schema 110a and the target schema 112a. Generally, each mapping 109 in the alignment can have one or more associated transformation rules 107a which translates data between the mapped fields (e.g. the fields in the source schema 110a mapped to a field in the target schema 112a).

The transformation rule engine 102 can include a rule generator 104 and/or a rule evaluator 106. The rule generator 104 can generate the transformation rules 107a, as described herein. The rule evaluator 106 can evaluate the transformation rules 107a and generate the evaluation results 107b.

In some embodiments, the rule generation request 101 can be specific to either the rule generator 104 or the rule evaluator 106. For example, the request 101 can be received by the rule generator 104 and can request rule generation functionality, as described herein, without specifying rule evaluation functionality. Alternatively or additionally, the request 101 can be received by the rule evaluator 106 and can request rule evaluation functionality, as described herein, without requesting rule generation functionality (e.g. such a request can specify transformation rules already generated, such as can be stored in a database or provided in the request).

The transformation rule engine 102 can generate test data 105. The test data 105 can include one or more records for a given transformation rule 107a. Generally, the test data 105 can be generated by processing source instance data 110b through an applicable transformation rule 107a to generate potential instance data for the target database 112. The test data 105 can then be evaluated, such as by the rule evaluator 106 as described herein, to determine the accuracy or effectiveness of the transformation rule 107a. In some embodiments, the test data 105 can be evaluated against, or otherwise compared to, the target data 112b. For example, the rule evaluator 106 can compare the test data 105 to the target data 112b to determine a degree of difference between the data sets, or classify the test data and the target data and determine if the data sets are similarly classified. Such evaluation can provide evaluation results 107b which can indicate the degree of effectiveness of the transformation rule.

In some embodiments, the rule generator 104 can generate the test data 105 based on the source data 110b, such as for each transformation rule 107a generated by the rule generator. Alternatively or additionally, the rule evaluator 106 can generate the test data 105 based on the source data 110b, such as for a given transformation rule 107a being evaluated. The test data 105 can be stored in memory for the transformation rule engine 102, or can be passed from the rule generator 104 to the rule evaluator 106, or can otherwise be stored and accessed by the transformation rule engine, such as in a database, data file, or other data variables or objects.

In practice, the systems shown herein, such as system 100, can vary in complexity, with additional functionality, more complex components, and the like. For example, there can be additional functionality within the transformation rule engine 102. Additional components can be included to implement security, redundancy, load balancing, report design, and the like. The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the instructions for implementing the transformation rule engine 102, the input, output and intermediate data of running the transformation rule engine, the rule generator 104, the rule evaluator 106, or the databases 110, 112, and the like can be stored in one or more computer-readable storage media or computer-readable storage devices. The technologies described herein can be generic to the specifics of operating systems or hardware and can be applied in any variety of environments to take advantage of the described features.

Example 3—Example Transformation Rule Engine with a Multitenant Rule Repository

Figure 1B:
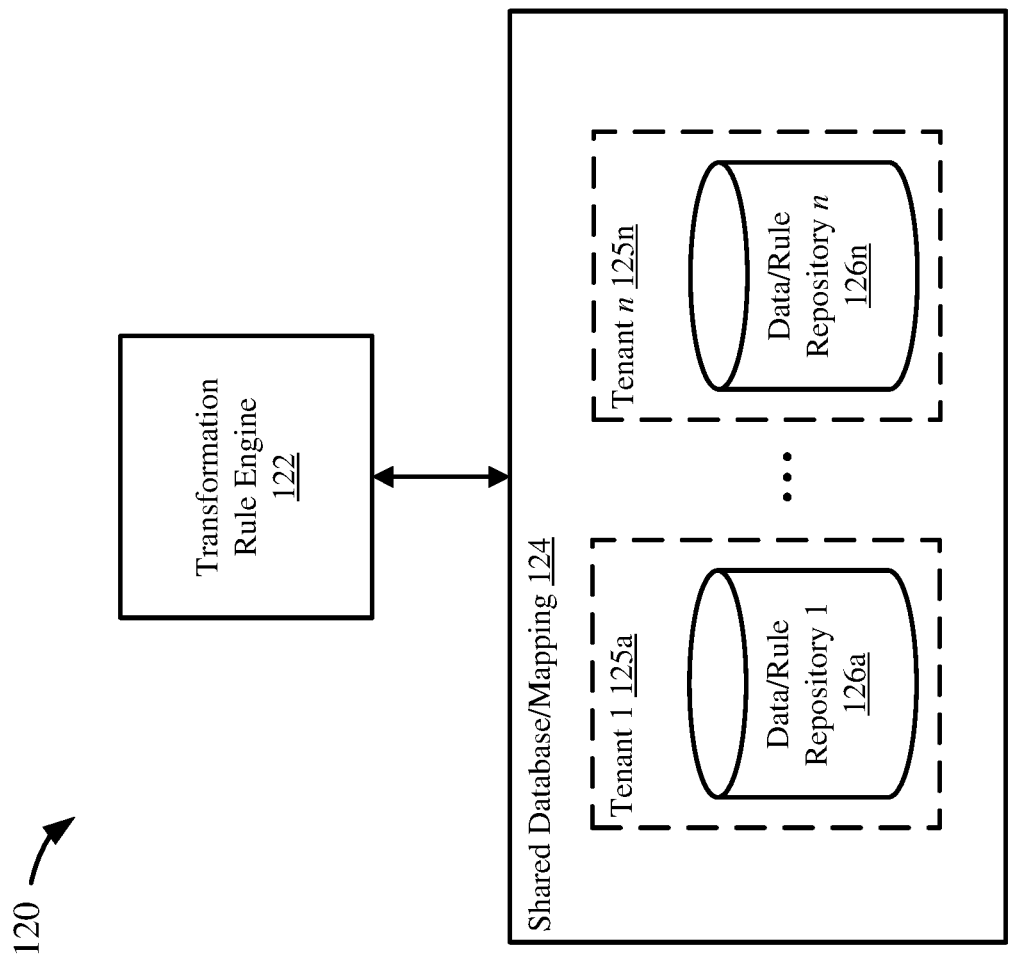
FIG. 1B is an architecture diagram depicting a transformation rule engine and a multitenant database arrangement.

FIG. 1B is an architecture diagram depicting a transformation rule engine and a multitenant database arrangement 120. A transformation rule engine 122 can generate and evaluate transformation rules from a shared database or data model mapping 124, similar to FIG. 1A. The shared database or data model mapping 124 can reside on a network (e.g. in the cloud) and can have one or more tenants, such as Tenants 1-n 125a-n, which access or otherwise use the shared database/mapping.

The tenants 125a-n can have their own respective sets of rules, rule data, or instance data in the database 124, such as Data/Rule Repository 1 126a for Tenant1 125a through Data/Rule Repository n 126n for Tenant n 125n. The rule repositories 126a-n can include rules, rule data, or instance data based on the database/data model, such as within a mapping for transforming a database/data model. The rule repositories 126a-n can reside outside tenant portions of the shared database 124 (e.g. secured data portions maintained separate from other tenants), so as to allow access to the rules, rule data, or instance data by the transformation rule engine 122 without allowing access to sensitive or confidential tenant information or data. The rule repositories 126a-n can have any sensitive or confidential information masked or removed, or may have all data removed and only contain rules or partial rules (e.g. subrules).

The transformation rule engine 122 can access some or all of the rule repositories 126a-n when accessing the shared database 124 to generate or evaluate transformation rules. In this way, the broad knowledge developed across multiple tenants, and database developers, specialists, or administrators of those tenants, can be accessed and used through transformation rule generation and evaluation, as described herein, to auto-generate or recommend transformation rules, including portions of rules or subrules.

Example 4—Example Mappings with Transformation Rules

Figure 2:
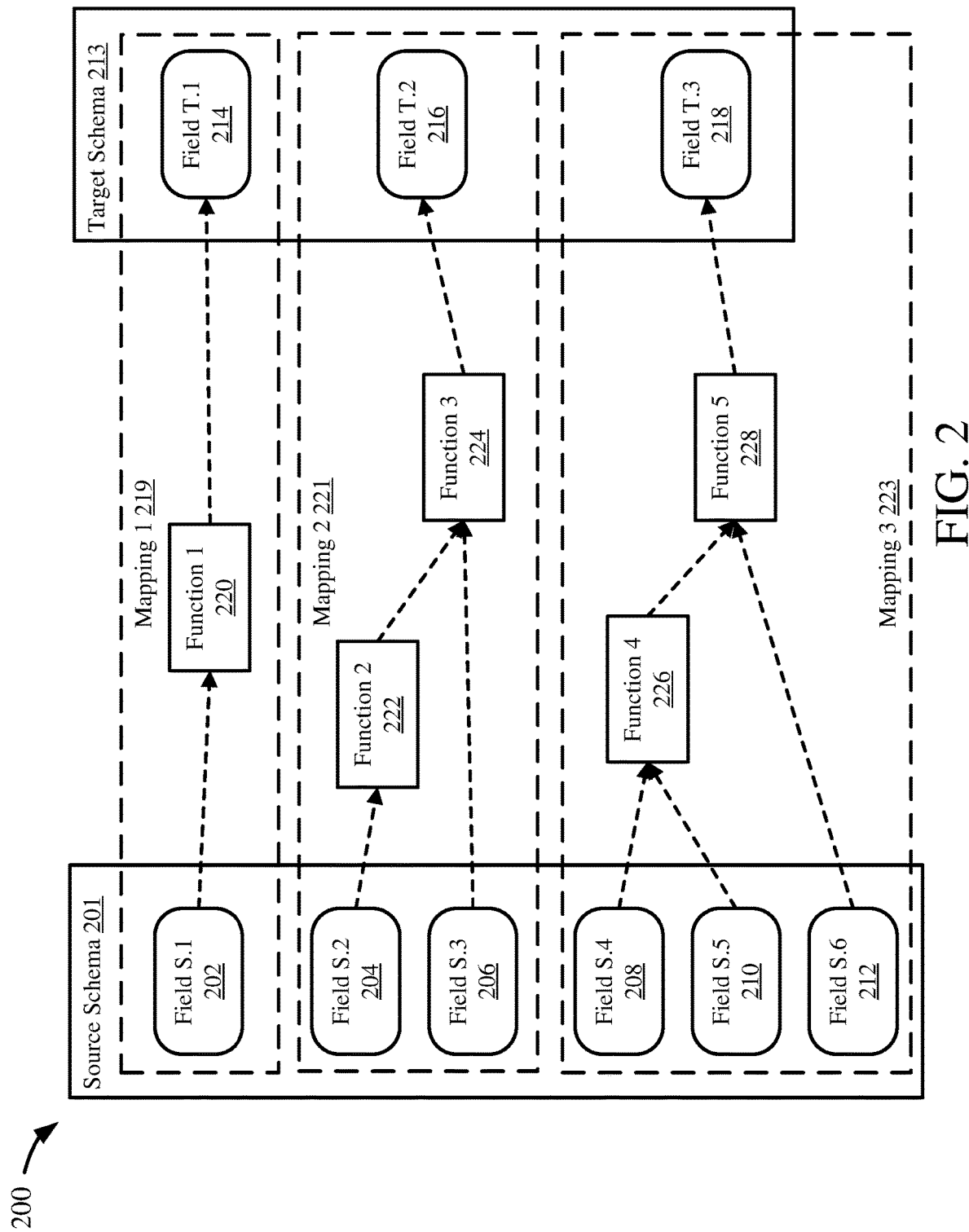
FIG. 2 is an example illustrating mappings and transformation rules between data models.

FIG. 2 is an example 200 illustrating mappings and transformation rules between data models. The example 200 is based on a source schema 201, having fields S.1-6 202, 204, 206, 208, 210, 212, and target schema 213, having fields T.1-3 214, 216, 218. The source schema 201 can be aligned with the target schema 213, such that the fields in the source schema 202, 204, 206, 208, 210, 212 have identified matching or partially matching fields in the target schema 214, 216, 218. The alignment can include mappings 219, 221, 223 identifying matching or partially matching fields in the aligned schemas 201, 213. Mapping 1 219 can identify that field S.1 202 in the source schema 201 is mapped to field T.1 214 in the target schema 213. Similarly, mapping 2 221 can identify fields S.2 and S.3 204, 206 are mapped to field T.2 216, and mapping 3 223 can identify fields S.4, S.5, and S.6 208, 210, 212 are mapped to field T.3 218.

Transferring instance data for a field can include performing one or more operations on the data before storing the instance data in the target data model. For example, data in field S.1 202 can be transformed by function 1 220 before being stored in field T.1 214. A transformation rule for mapping 1 219 can include function 1 220 and the relevant fields, field S.1 202 and field T.1 214. A mapping (e.g. 219, 221, 223) can include or otherwise be associated with a transformation rule, as described herein.

Similarly for mapping 2 221, field S.2 can be transformed by function 2 222, and the results of function 2 and field S.3 can be transformed by function 3 224 to match with the mapped field T.2 216.

Similarly for mapping 3, 223, field S.4 208 and field S.5 210 can be transformed by function 4 226. Field S.6 212 and the results of function 4 226 can be transformed by function 5 228 to generate data for the mapped field T.3 218.

In these ways, fields can be transformed using identified functions 220, 222, 224, 226, 228 to translate data from fields in the source schema 201 to their corresponding mapped fields in the target schema 213. In some cases, a function 220, 222, 224, 226, 228 may not be needed to translate data between mapped fields. In some cases, the same function can apply to multiple mappings. For example, function 1 220 can be the same as function 2 222.

Generally, each mapping in an alignment between schemas can be associated with a transformation rule including the fields, functions, and/or other logic (e.g. logic statements such as IF or SWITCH statements) to translate the data for the mapping from the source data model to the target data model.

Figure 3A:
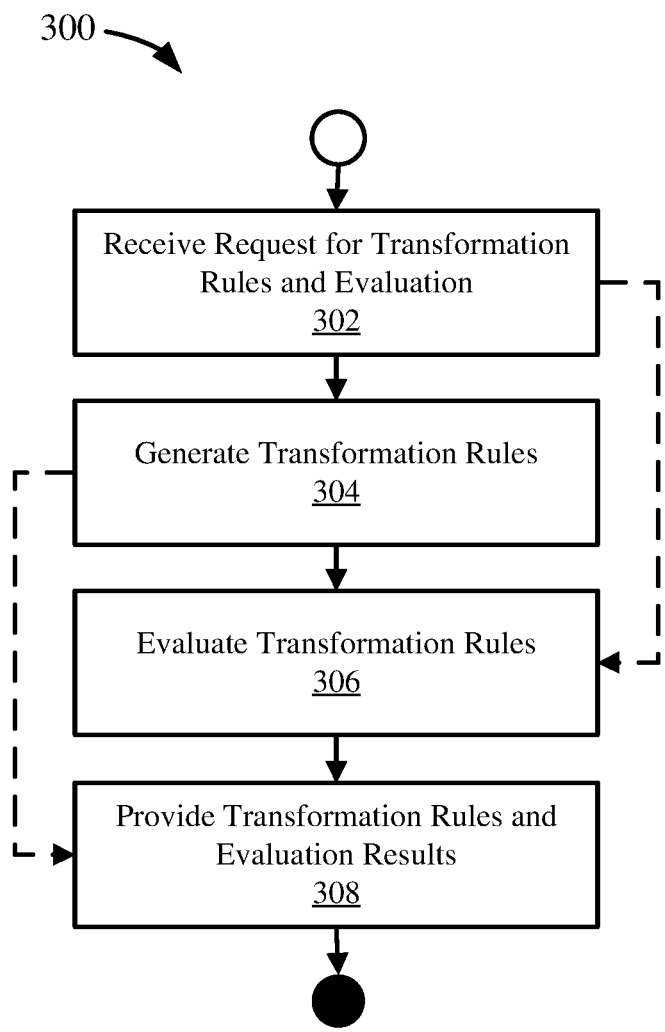
FIG. 3A is a flowchart of an example method of generating and evaluating transformation rules for an alignment between data models.

Example 5—Example Method that Generates and Evaluates Transformation Rules for Mappings in an Alignment Between Data Models FIG. 3A is a flowchart of an example method 300 of generating and evaluating transformation rules for an alignment between data models and can be implemented, for example, by the systems described in FIGS. 1A-B.

At 302, a request for transformation rules can be received. A transformation rules request can include one or more variables or input arguments, such as described herein. For example, a transformation rules request can include an alignment or an identifier for an alignment, a source data model or an identifier for a source data model, a target data model or an identifier for a target data model, a set of function identifiers or an identifier for a set of functions, a set of function filters or an identifier for a set of function filters, one or more data classes or classifiers, or other settings for generating transformation rules, such as described herein. In some cases, a location housing input data (e.g. a database, a data file) can be provided for a data input (e.g. source data model, set of functions, etc.).

At 304, one or more transformation rules can be generated. The transformation rules generated at 304 can be based on mappings in an alignment, as can be provided in or accessed via the request received at 302. Further, the transformation rules generated at 304 can include one or more functions, such as can be provided or identified in the request received at 302. Generally, one or more transformation rules are generated for each mapping in an alignment between data models. In this way, a set of transformation rules can be generated for a mapping, and a set of sets of transformation rules can be generated for an alignment such that each mapping has an associated set of transformation rules (e.g. one or more transformation rules).

At 306, the generated transformation rules can be evaluated. The transformation rules can be evaluated based on their results in processing instance data from the source database. The transformation rules can be evaluated using one or more classifiers, as described herein. The classifiers can be used against both test data (e.g. transformed source data using a transformation rule) and target instance data, to determine if the classifier can discriminate between the test data and the target instance data. In this way, the classifiers can be used to evaluate or validate the transformation rules.

The classifier outcomes or results can be used for ranking the transformation rules for a given mapping. If the one or more classifiers can identify transformed source data (e.g. test data) from the target instance data, then the transformation rule associated with the test data can be ranked lower, and generally receive a lower evaluation result. If the one or more classifiers generally cannot, or otherwise have difficulty, discriminating test data (e.g. source data transformed by a transformation rule) from the target instance data, then the transformation rule can be ranked higher, and generally receive a better evaluation result.

At 308, the transformation rules and/or the evaluation results of the transformation rules can be provided. Additionally or alternatively, providing the logic statement options can include providing metadata associated with the logic statement options, or other information about the logic statement options. The logic statement options can be provided as additions to the input rule. In some embodiments, the transformation rules can be provided as an ordered set, where the order indicates their evaluation results or ranking.

The transformation rules and evaluation results can be provided at 308 through a user interface, which can allow for selection of a final transformation rule for their associated mappings. Alternatively or additionally, the transformation rules and/or evaluation results can be provided through an API, such as to another system, or through a messaging interface.

In some cases, providing the transformation rules at 308 can include storing the transformation rules and/or their evaluation results. For example, the transformation rules can be stored as records in a database or as graphical representations of rules. The transformation rules can be stored along with their respective evaluation results. The transformation rules can be stored in the alignment for which they were generated, or in association with the alignment.

In some embodiments, after providing the transformation rules, a selection of one or more of the transformation rules can be received for one or more of the mappings in the alignment. The received selection(s) can then be associated with mapping in the alignment, or in association with the alignment, and can be stored as described herein.

The method 300 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example 6—Example Method that Generates Transformation Rules for a Mapping

Figure 3B:
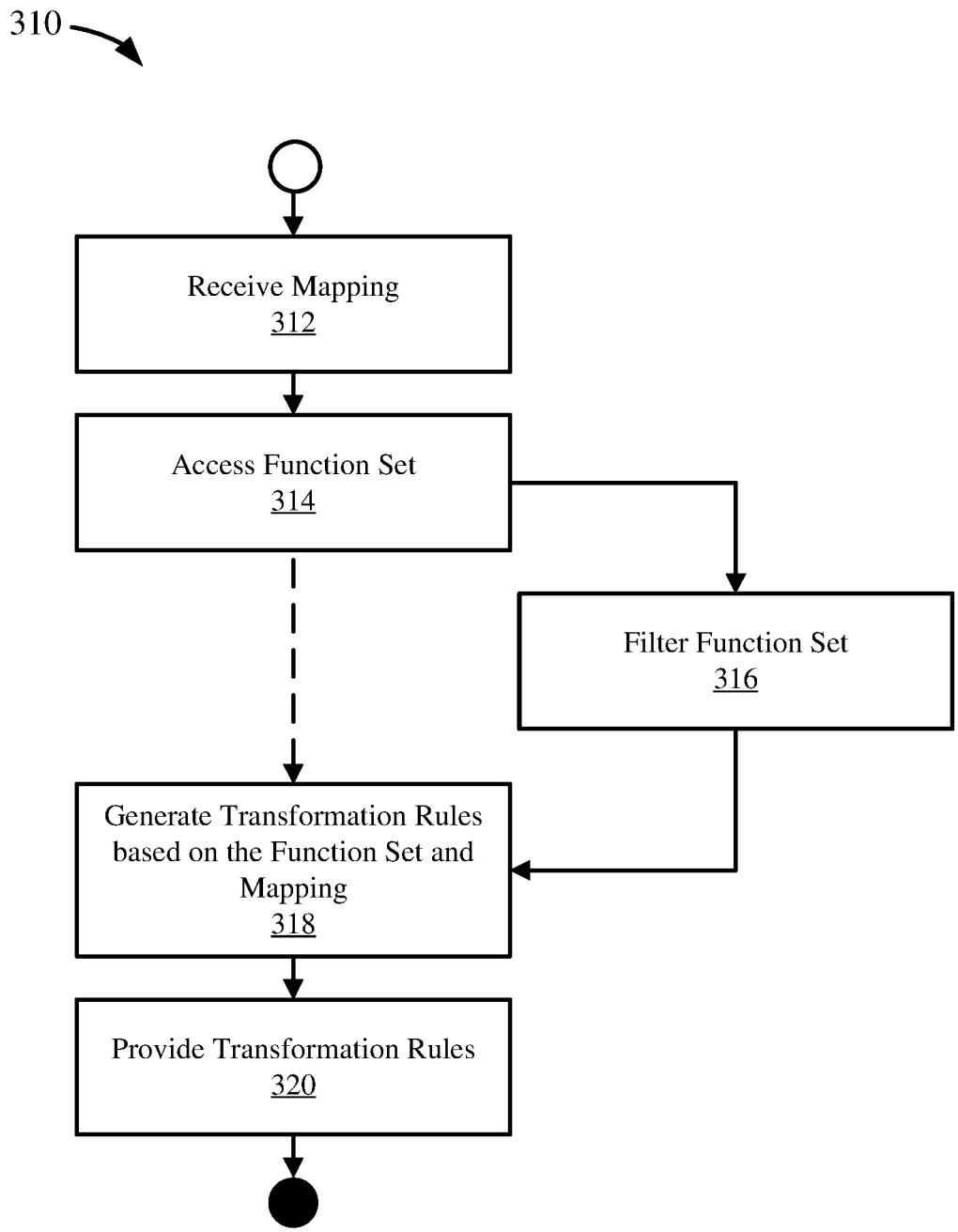
FIG. 3B is a flowchart of an example method of generating transformation rules for a mapping between fields in data models.

FIG. 3B is a flowchart of an example method 310 of generating transformation rules for a mapping between fields in data models and can be implemented, for example, by the systems described in FIGS. 1A-B. The process 310 can be integrated with the process 300, as shown in FIG. 3A. The process 310 can be integrated as step 304 in process 300 (in whole or in part). For example, transformation rules for an alignment can be generated via process 300, and the process 310 can be invoked (in parallel or in series) to generate transformation rules for each mapping in the alignment.

At 312, a mapping can be received. Receiving a mapping at 312 can include receiving an identifier for a mapping, such as in an alignment, and accessing the mapping. Receiving the mapping at 312 can include receiving or otherwise obtaining data of the mapping, such as the source fields and the target field and further information about these fields (such as data types and the like). The mapping can be received separately, or can be received as part of an alignment. Receiving the mapping at 312 can include accessing a record or other data storage object to obtain the mapping.

At 314, a function set can be accessed. Accessing a function set at 314 can include retrieving or otherwise obtaining names, identifiers, and/or other information, such as the number and type of input arguments or output arguments, regarding one or more functions accessible to the process 310.

The function set accessed at 314 can be applicable or related to the mapping received at 312, or can be related or applicable to an alignment which includes the received mapping. In some cases, the function set accessed at 314 can be identified in request to initiate the process 310 (e.g. such as when integrated with process 300) or be identified in an alignment or context of software implementing the technology described herein.

In some cases, the function set can be available in local memory. In other cases, the function set can be available in a database or rule repository (e.g. a file), and accessing the function set at 314 can include accessing the database or rule repository and obtaining the function set.

At 316, the function set can be filtered. Filtering the function set at 316 can include removing, hiding, ignoring, or otherwise indicating any functions in the accessed function set which should not be used in generating transformation rules (e.g. at 318). For example, filtered functions can be removed from a current list of functions for the current instance of the process 310, or a flag for filtered functions can be set indicating to skip or avoid the flagged functions.

Functions can be filtered at 316 based on the function definition accessed at 314 and the mapping received at 312. For example, functions whose input data types do not match any source fields in the mapping can be filtered from the function set. This is to avoid functions which cannot or do not effectively or meaningfully process the source data in the mapping. For example, for source fields in the mapping that are string types, functions that process integers as inputs can be filtered.

Further, functions can be filtered based on the number of input arguments compared to the number of source fields in the mapping. For example, a function which requires three input arguments can be filtered for a mapping with only one or two source fields.

Further, functions can be filtered based on one or more function filters, which can be accessed or otherwise retrieved at 316. For example, a function filter can indicate that a particular function should not be used (e.g. the function is in testing and not yet available for use), and so the function can be filtered from the function set based on this filter. Other filters can be implemented, either through user configuration or by system developers, which can be used to filter the function set at 316.

In some cases or embodiments, the function set may not be filtered at 316. For example, no filters may be available to filter the function set.

At 318, one or more transformation rules can be generated. Generating the transformation rules at 318 can be based on the function set accessed at 314, or the filtered function set from 316, and the mapping received at 312. Generating the one or more transformation rules at 318 can include defining a separate transformation rule for each combination of source fields from the mapping and available functions in the function set or filtered function set. In this way, a set of transformation rules can be generated for the received mapping. Generally, each transformation rule generated in this way can use all source fields from the mapping, thus avoiding partial rules which do not fully transform the data for mapping because one or more fields is excluded.

Generally, a transformation rule produces an output value which can be assigned to the target field of the mapping. Further, a transformation rule receives as input the source fields from the mapping and processes the fields through one or more functions from the function set (or filtered function set).

Further, generating transformation rules at 318 can include generating one or more transformation subrules, which can be used in complete transformation rules. For example, a subrule can use a subset of the source fields in the mapping, applied in one or more functions. In this way, multiple functions can be used in a transformation rule, each working on a portion of the source mapping fields. As an example, a mapping with three source fields can have generated a subrule using a first function using two of the source fields, and then a complete transformation rule using the subrule and the remaining source field.

In some cases, logically equivalent variants of transformation rules can be skipped and not generated at 318. For example, for functions where the order of input arguments does not matter, transformation rules that only change the order of the inputs (e.g. source fields) can be redundant (e.g. are known to produce the same output) and so skipped and not generated. In other cases, where the order of inputs is relevant to the output generated, the transformation rule variants with different order of source fields input to a function can be generated as a separate transformation rule.

At 320, the transformation rules can be provided. Providing the transformation rules at 320 can be similar to step 308 in process 300, as shown in FIG. 3A. Providing the transformation rules at 320 can include making the transformation rules available to process 300, such as by storing the transformation rules in local memory for the process, or passing the transformation rules to the process 300.

Providing the transformation rules at 320 can include associating the transformation rules with the mapping received at 312. In some embodiments, the transformation rules can be associated with the mapping when generated at 318. Associating the transformation rules with the mapping can include storing the transformation rules with a reference to the mapping and/or including a reference in the mapping to the transformation rules. Additionally or alternatively, the transformation rules can be stored in the mapping itself, or in the alignment of the mapping, with a reference or other identifier for the mapping.

Example 7—Example Method that Evaluates Transformation Rules for a Mapping

Figure 3C:
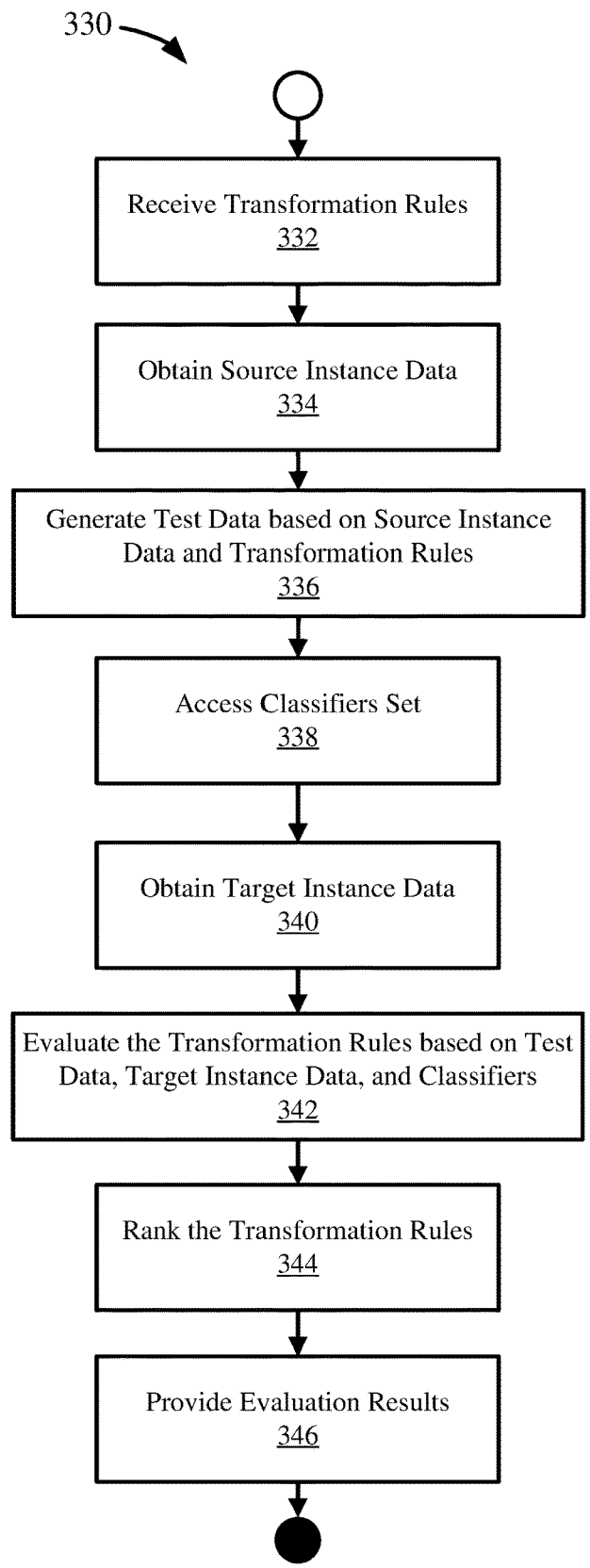
FIG. 3C is a flowchart of an example method 330 of evaluating transformation rules for a mapping.

FIG. 3C is a flowchart of an example method 330 of evaluating transformation rules for a mapping and can be implemented, for example, by the systems described in FIGS. 1A-B. The process 330 can be integrated with the process 300, as shown in FIG. 3A. The process 330 can be integrated as step 306 in process 300 (in whole or in part). For example, evaluation results of transformation rules for an alignment can be generated via process 300, and the process 330 can be invoked (in parallel or in series) to generate evaluation results for the transformation rules for each mapping in the alignment.

At 332, one or more transformation rules can be received. Receiving the transformation rules at 332 can include receiving one or more identifiers for the transformation rules. Alternatively or additionally, a location for the transformation rules can be received, and the rules can be retrieved from the location. In some embodiments, the transformation rules themselves can be received at 332. For example, process 330 can be integrated with process 310 as shown in FIG. 3B, and receiving the transformation rules at 332 can be integrated with or be responsive to providing the rules at step 320 in process 310.

At 314, source instance data can be obtained. Generally, obtaining source instance data at 334 can include accessing a source database and retrieving one or more records as the instance data from the source database. In some cases, a predefined number of source records can be obtained at 334, which can be user-configurable or a minimum number determined to be effective in transformation rule evaluation. Generally, the source instance data can be related to the mapping of the transformation rules, and the alignment of the mapping. For example, data for retrieving the source instance data (e.g. database name, location, etc.) can be available in the alignment of the mapping of the received transformation rules.

In some cases, the transformation rules can be available in local memory. In other cases, the transformation rules can be available in a database or rule repository (e.g. a file), and receiving the transformation rules at 332 can include accessing the database or rule repository and obtaining the transformation rules. This can be similarly true for the source instance data.

At 336, test data can be generated. Generally, the test data can be based on the source data obtained at 334 and the transformation rules received at 332. Generating test data at 336 can include generating one or more test data records respectively associated with the source instance data records. Generating the test data records can include executing the transformation rules received at 332 using the source instance data obtained at 334. For example, for each of the transformation rules received at 332, the transformation rule can be process using source instance data obtained at 334. In this way, each transformation rule can have associated with it a test data set which is the source instance data processed by the transformation rule. Thus, generally each test data set can have the same number of records as the source instance data. Generally, test data generated at 336 can be stored in local memory, but in some cases the test data can be stored in a data repository, such as a database. Generally, each test data set is associated with the transformation rule used to generate the test data set.

In some embodiments, generating the test data as in steps 334 and 336 can be integrated into generating the transformation rules as shown in process 310. For example, after generating the transformation rules at 318, steps 334 and 336 can be performed to generate the test data associated with the transformation rules, and provided along with the transformation rules (e.g. at 320). In such embodiments, generating the test data at 334 and 336 can be skipped in process 330. Further, the test data can be received or otherwise accessed or obtained along with the transformation rules at 332.

At 338, a set of classifiers can be accessed. Generally, accessing the set of classifiers at 338 can be similar to accessing the set of functions as at step 314 of process 310 shown in FIG. 3B. In some embodiments, accessing the classifiers at 338 can include filtering classifiers not applicable to the current transformation rules, mapping, and/or alignment, or are otherwise indicated to not use (e.g. user-selected to ignore, or the like).

At 340, target instance data can be obtained. Obtaining target instance data at 340 can be similar to obtaining source instance data at 334, but from the target database, as provided by the alignment and/or mapping of the transformation rules received at 332.

At 342, the transformation rules can be evaluated. Generally, evaluating the transformation rules at 342 can be based on the test data generated at 336 (or otherwise received or retrieved), the target instance data, and/or the classifiers from step 338. Evaluating the transformation rules at 342 can include executing the classifiers with the test data generated at 336 and/or the target instance data obtained at 340.

In some embodiments, the classifiers can be machine-learning algorithms which classify input data into learned categories. In such embodiments, the target instance data and the generated test data can be used to train the classifier algorithm. In this way, the classifier can learn how to discriminate between the target instance data and the generated test data, and the classifiers can be used to evaluate or validate the transformation rules.

Once trained on the target instance data and the generated test data, the classifier machine-learning algorithm can be executed with the test data generated at 336. Based on the classification of the test data for a given transformation rule, a score, confidence value, or percentage accuracy can be calculated for the transformation rule. The score, confidence value, or percentage accuracy can represent the similarity between the test data and the target instance data. The classifier can be run for each set of test data for each transformation rule, thus evaluating each transformation rule and generating an evaluation result for the transformation rule.

In some embodiments, multiple classifiers (e.g. different machine-learning algorithms, which may target different characteristics of the data) can each be used to evaluate the transformation rules. In such cases, the results of each classifier can be combined or integrated to form a final score, confidence value, or percentage accuracy for each transformation rule.

At 344, the transformation rules can be ranked. Ranking the transformation rules at 344 can include sorting or otherwise organizing the transformation rules based on the evaluation results from 342. For example, the transformation results can be ranked based on a score, confidence value, or percentage match generated as part of the evaluation results. Generally, the transformation rules can be sorted with the better ranked, e.g. more accurate or more rules which generate test data more similar to the target data, transformation rules first and lesser ranked later.

Additionally or alternatively, ranking at 344 can include filtering the transformation rules to remove any rules which do not meet a score threshold, or other evaluation result threshold. For example, transformation rules with a score, confidence value, or percentage match that does not meet a threshold can be removed from the set of transformation rules. As another example, a fixed number of transformation rules can be retained, such as the top three transformation rules, and other transformation rules can be removed. In some embodiments, a transformation rule can be automatically selected, such as the rule with the highest score, and be assigned to the mapping.

At 346, the evaluation results of the transformation rules can be provided. Providing the evaluation results at 346 can be similar to step 308 in process 300, as shown in FIG. 3A, and/or step 320 in process 310, as shown in FIG. 3B. Providing the evaluation results of the transformation rules at 346 can include making the evaluation results available to process 300, such as by storing the evaluation results in local memory for the process, or passing the evaluation results to the process 300.

Providing the evaluation results of the transformation rules at 346 can include associating the evaluation results with their respective transformation rules. In some embodiments, the evaluation results can be associated with their transformation rules when generated at 342. Associating the evaluation results with their respective transformation rules can include storing the evaluation results with a reference to their transformation rules. Additionally or alternatively, the evaluation results can be stored with their transformation rules, such as in a specialized data object.

Figure 4A:
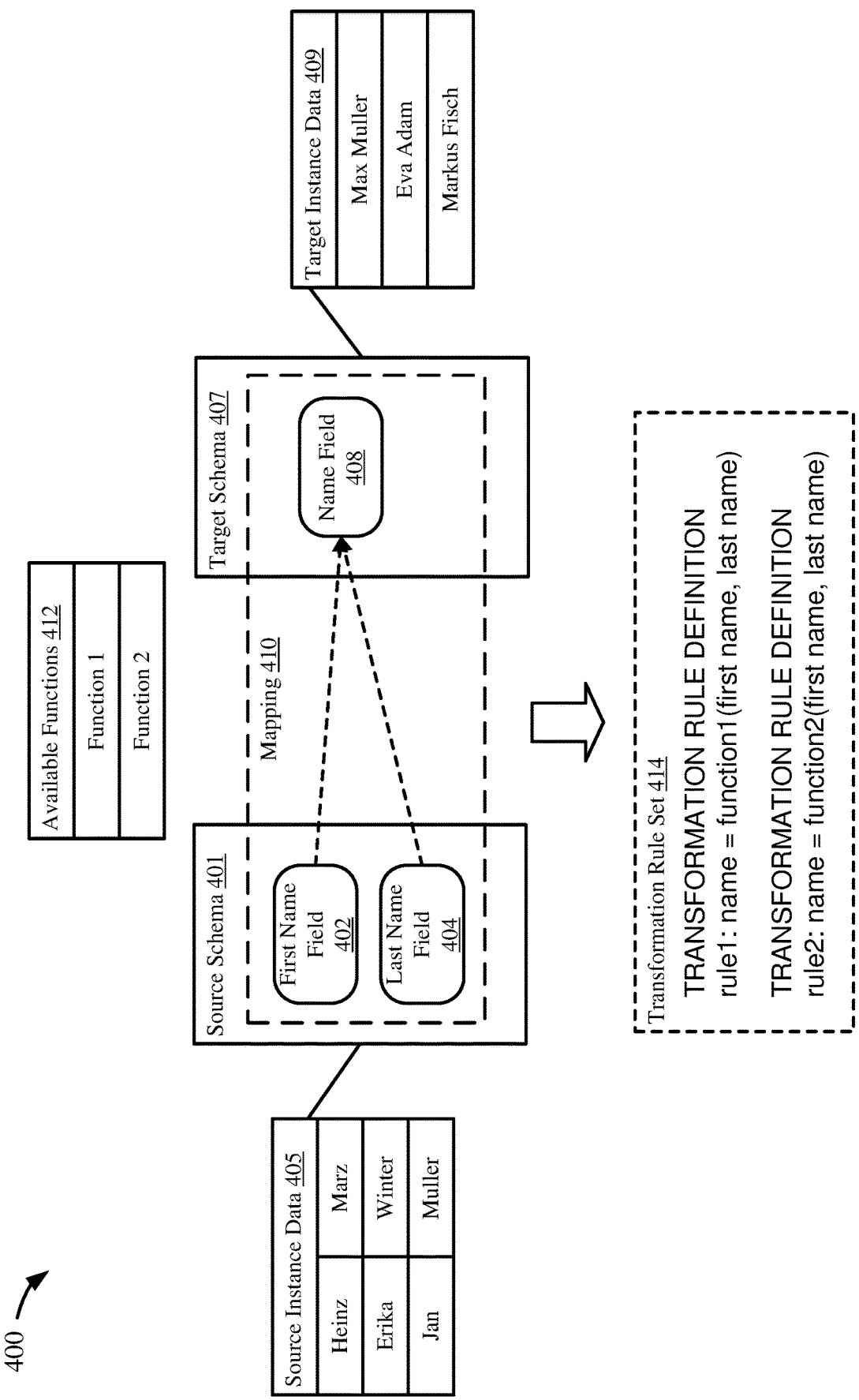
FIGS. 4A-4C are an example illustrating how a set of transformation rules can be generated for a mapping between a source database and a target database.
Figure 4B:
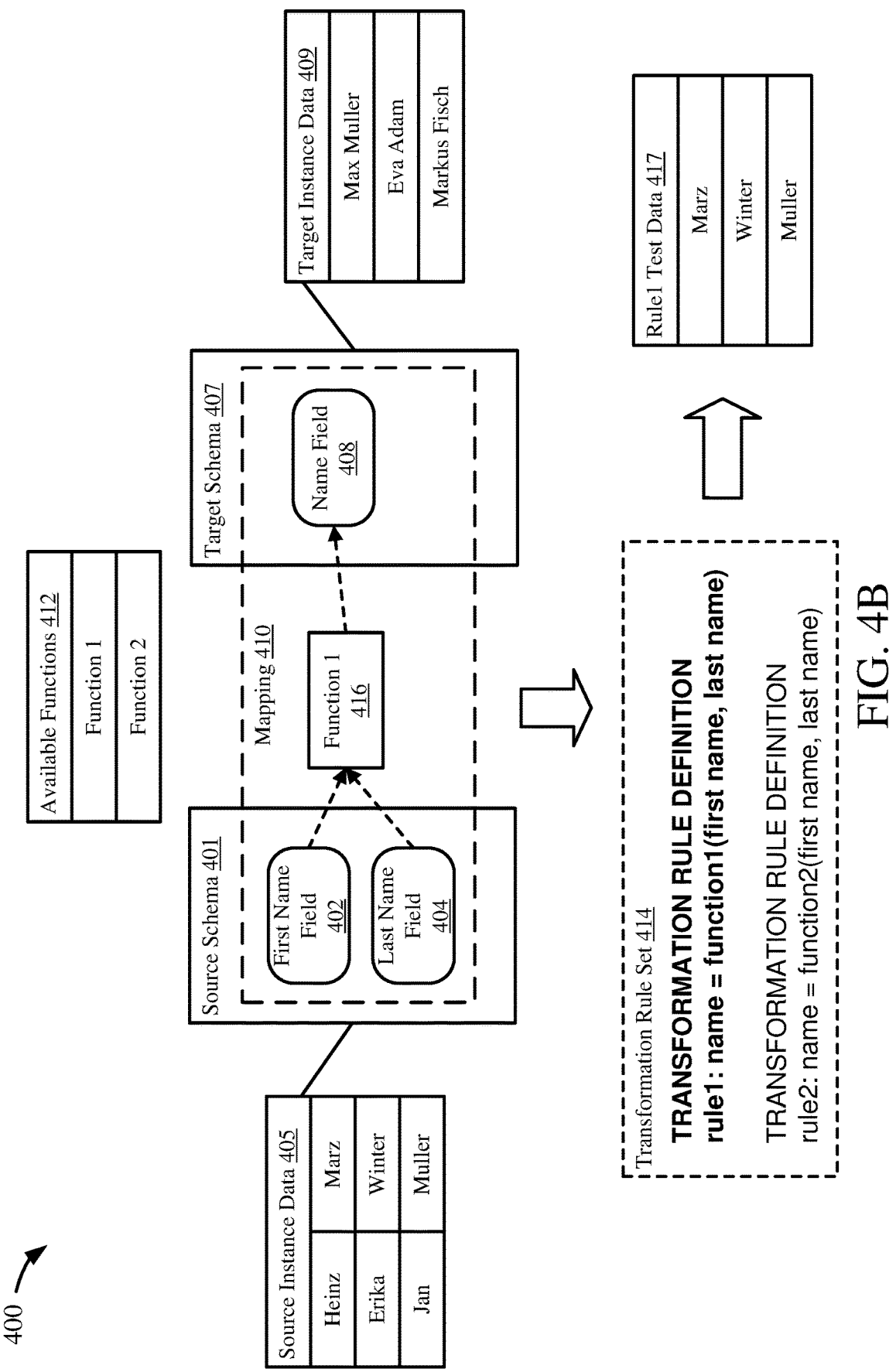
Figure 4C:
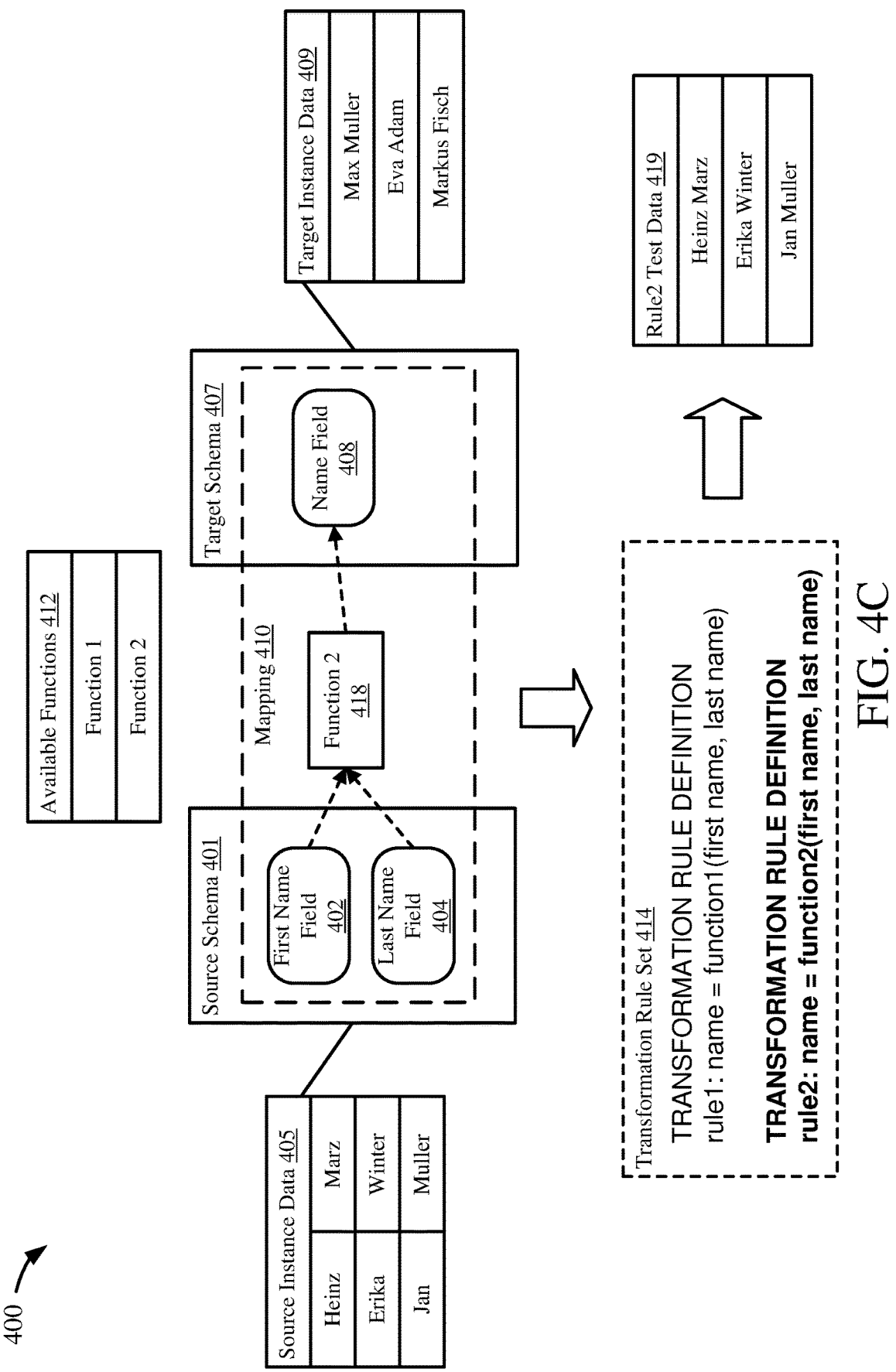

Example 8—Example Transformation Rule Generation for a Source Database, Target Database, and Available Functions FIGS. 4A-C are an example 400 illustrating how a set of transformation rules can be generated for a mapping between a source database and a target database, as described herein.

A source schema 401 can include two fields, a first name field 402 and a last name field 404. The source schema 401 can be associated with source instance data 405, having records for the fields 402, 404 defined by the source schema (in this case, three records). A target schema 407 can include a name field 408. The target schema 407 can be associated with target instance data 409, having records for the name field 408 defined by the target schema (in this case, three records).

A mapping 410 can map (e.g. associated the identifiers for the fields 402, 404, 408) the first name and last name fields 402, 404 in the source schema 401 to the name field 408 in the target schema 407. The mapping 410 can be associated with or stored in an alignment (not shown) between the source schema 401 and the target schema 407.

A set of functions 412 can be available, which can include function 1 and function 2 as shown. The set of functions 412 can be pre-filtered list of available functions. Alternatively, the set of functions 412 can be a list of available functions after filtering. For example, function 1 and function 2 in the set of functions 412 can be the remaining functions available after other functions have been filtered from the list, such as functions that do not process the data types of the fields 402, 404, 408, or functions that a user has indicated not to consider (e.g. flagged to ignore).

As described herein, a set of transformation rules 414 can be generated for the mapping 410 based on the available functions 412. The set of transformation rules 414 generally includes the logically distinct applications of the available functions 412 to the source fields 402, 404 identified in the mapping 410. Thus, transformation rule1 applies function 1 to the first name field 402 and the last name field 404 of the source schema 401 as identified by the mapping 410 (and can store the result in a name field 408 of the target schema 409). Similarly, transformation rule2 applies function 2 to the first name field 402 and the last name field 404 of the source schema 401 as identified by the mapping 410 (and can store the result in a name field 408 of the target schema 407). Next, test or instance data can be generated for each rule in the transformation rule set 414.

FIG. 4B continues the example 400, illustrating the generation of test data 417 for transformation rule1. Function 1 416 can be applied to source instance data 405 of the first name field 402 and the last name field 404, as defined in transformation rule1 in the transformation rule set 414. Processing the source instance data 405 through function 1 416 as defined in transformation rule1 (e.g. processing rule1 on the source instance data) can result in rule1 test data 417, having records corresponding to the records in the source instance data, but transformed by function 1.

FIG. 4C continues the example 400, illustrating the generation of test data 419 for transformation rule2. Function 2 418 can be applied to source instance data 405 of the first name field 402 and the last name field 404, as defined in transformation rule2 in the transformation rule set 414. Processing the source instance data 405 through function 2 418 as defined in transformation rule2 (e.g. processing rule2 on the source instance data) can result in rule2 test data 419, having records corresponding to the records in the source instance data, but transformed by function 2.

Comparing rule1 test data 417 and rule2 test data 419 can illustrate how different functions (e.g. function 1 and function 2) can transform the same data differently, and with different degrees of accuracy or effectiveness compared to the target instance data 409 of the target schema 407. Generally, reviewing the rule2 test data 419 illustrates that function 2 (e.g. 418) provides results more similar to the target instance data 409 than does function 1 (e.g. 416), and therefore transformation rule2 is more likely to be an effective transformation rule for the mapping 410, compared to function 1.

Figure 5A:
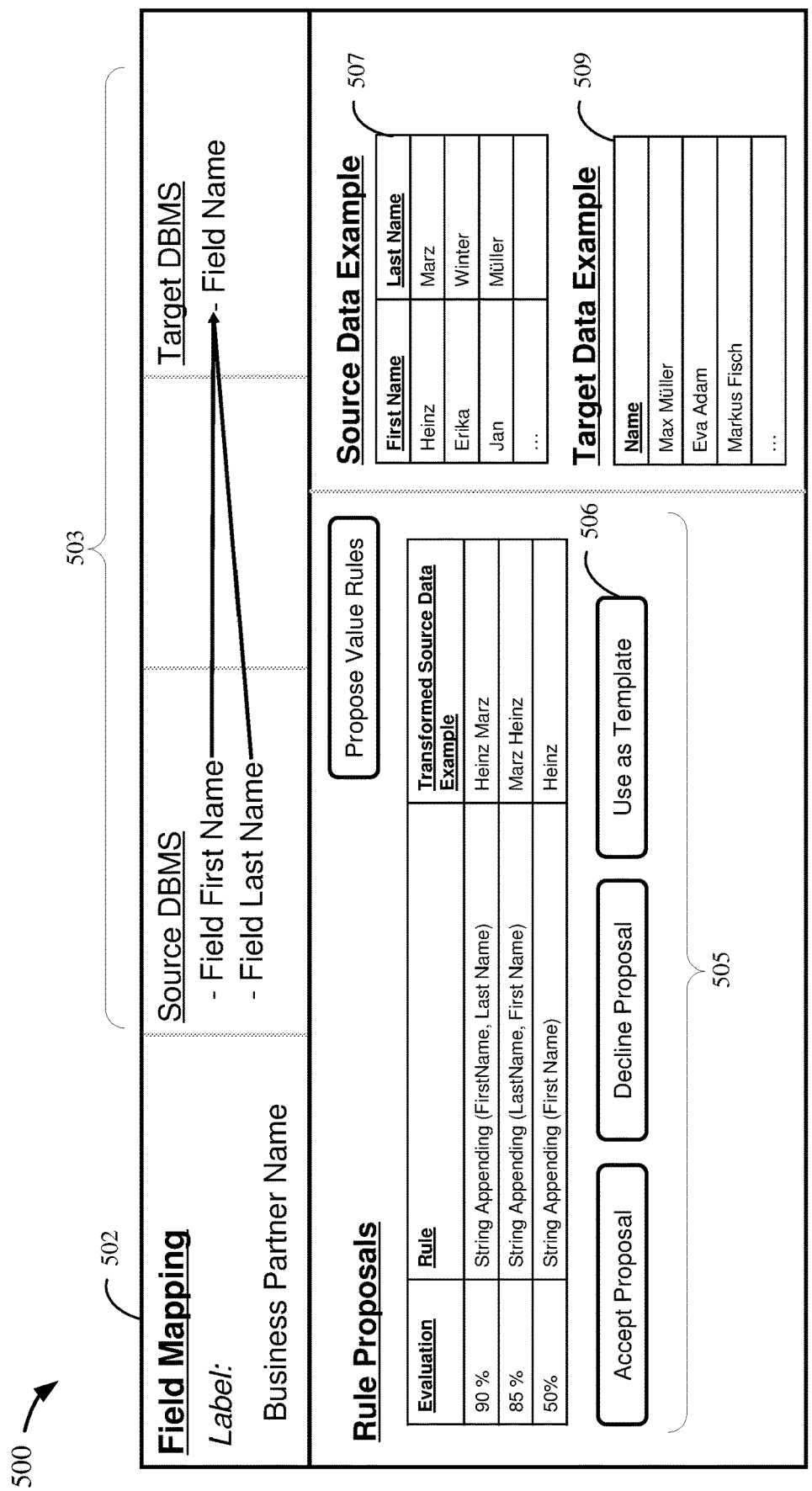
FIG. 5A is an example illustrating a user interface providing transformation rule generation and evaluation functionality.

Example 9—Example User Interface for Transformation Rule Generation and Evaluation FIG. 5A is an example 500 illustrating a user interface 502 providing transformation rule generation and evaluation functionality, as described herein. The user interface 502 can have several sections, such as a mapping section 503 indicating a current mapping between databases or data models, a transformation rule section 505 providing a set of transformation rules for the mapping 503, and a data example section providing example source instance data 507 and example target instance data 509.

The transformation rules section 505 can provide the set of generated transformation rules ("Rule"), the evaluation results for the rules ("Evaluation"), and example test data for each rule ("Transformed Source Data Example"). Based on this, a user can select a transformation rule to associate with the mapping 503. In some embodiments, an option 506 can be provided to allow a user to edit a selected transformation rule (e.g. to use a generated rule as a template). In other embodiments, a transformation rule can be automatically selected to associate with the mapping 503, such as if the evaluation result for a rule exceeds a threshold (e.g. >=90%, or the like).

The source data examples 507 can be obtained from the source database, and the target data examples 509 can be obtained from the target database. Viewing the source data examples 507 and the target data examples 509 can assist a user in understanding the transformation rule results and in selecting a transformation rule to use for the mapping 503.

Figure 5B:
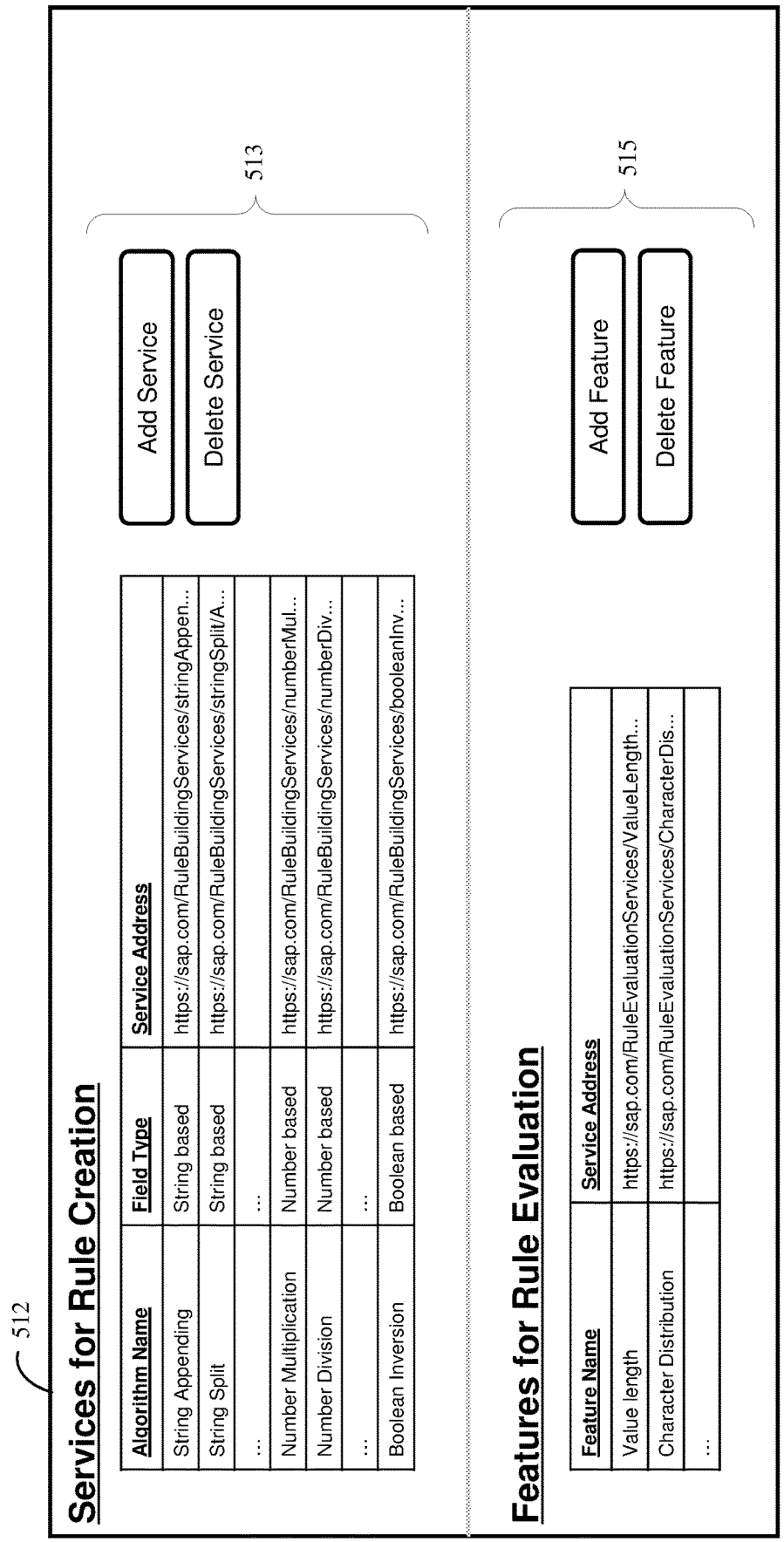
FIG. 5B is an example illustrating a user interface providing a customizable list of functions for transformation rule generation and features for rule evaluation.

FIG. 5B is an example 510 illustrating a user interface 512 providing a customizable list of functions for transformation rule generation 513 and features for rule evaluation 515, as described herein. A user can add or remove functions (e.g. services) in the user interface 512, and can similarly remove evaluation or classification features in the user interface. A similar user interface can be used for function filters.

Example 10—Example Alignment and Mapping

In any of the examples herein, an alignment can include a group or collection of one or more mappings. Generally, an alignment can include information relating to translating a source data model to a target data model, such as to transfer storage of data from a database or other data repository implementing the source data model to a database or other data repository implementing the target data model. For example, an alignment can include an identifier, location, or other information for a source database, and similar information for a target database.

In any of the examples herein, a mapping can include identifiers for fields or other data objects in a source data model and a target data model that represent the same or similar data (e.g. records). For example, a mapping can include identifiers for database fields in a source database, and an identifier for a field in a target database that stores substantively similar data as the field(s) in the source database.

Further, a mapping can include or be associated with one or more transformation rules or logic for transforming data from a source database/data model to a target database/data model, as described herein. Mappings can cover larger sets of instance data, or additional processing flows. Mappings can also integrate different sets or subsets of data or functionality.

Example 11—Example Transformation Rules

In any of the examples herein, a transformation rule can include an identifier and one or more functions or operations performed on one or more input arguments. A transformation rule can be composed of multiple smaller rules or subrules. A transformation rule or subrule can further be composed of one or more rule building blocks.

In some cases, a transformation rule can include one or more first order logic statement which evaluates to true or false. Generally, an operational statement (e.g. a rule building block and/or a function call) can follow a logic statement in a transformation rule.

A rule building block can include two operands and an operator. The operands can be a field or variable, or a value. In some cases, an operand can be another rule or rule building block. For example, a rule building block can be composed of a field, an operator, and a value, such as in a logic statement "field1=4." Thus, a rule can be composed of a single rule building block, or multiple rule building blocks. A rule building block can be a rule, as described herein. As an example, a node in a rule tree as described herein, can be a rule building block. In some cases, a rule building block can include a single function with input arguments (e.g. an executable function call with inputs).

Transformation rules can be used to process instance data, such as source database records, to generate instance data for a target data model. Thus, rules can be used to transform data records from one database/data model to another database/data model. Generally, transformation rules change the format or structure of instance data, without substantively changing the instance data. Thus, source instance data is generally logically equivalent to target instance data.

Transformation rules and rule building blocks can be stored in a transformation rule framework. Such a transformation rule framework can be accessible by a transformation rule engine, and provide transformation rule generation and evaluation services or functionality, as described herein. For example, the transformation rule framework can provide the transformation rule engine as a service or set of microservices in a cloud environment.

Example 12—Example Functions

In any of the examples herein, a function, or transformation function, can include an algorithm, a process, one or more operations, or other logic which processes one or more input arguments into one or more output arguments. A function can have a name or other function identifier, and can be defined, at least in part, by a set of input arguments having respective types (e.g. data types) and a set of output arguments having respective types (e.g. data types). Generally, a function can include executable code which can be invoked by a function call, a method call, a service or microservice call, or otherwise be initiated.

Generally, a function can receive one or more inputs, execute one or more operations and/or logic, and provide an output. As described and used herein, a function generally receives instance data (e.g. a record) from a source database, performs one or more operations and/or logic against the source database record to transform the record data, and provides an output of the transformed record/field(s). Generally, the transformed output record or field should match the schema of the target database. For example, a function can convert the format of a source record from the source database, or a field of a source record, into the format of the corresponding (e.g. mapped) field in a target database, allowing the record to be transferred and stored in the target database from the source database. In this way, transformation functions can facilitate data transfer between different data repositories having different data models, but storing similar or related data.

A function can be a unary function. A unary function generally accepts a single input argument and produces a single output argument. For example, a data format conversion function can receive a date data input, convert the format of the date (e.g. from MMDDYYYY to YYYYMMDD), and provide the convert date as output.

A function can be a folding function. A folding function generally accepts multiple input arguments and produces a single, or in some cases reduced, output argument. In this way, a folding function can fold two or more data inputs into a single data output. For example, a concatenate function can receive two name input fields (e.g. strings), append the name fields together (e.g. "Jan" and "Muller" to "Jan Muller"), and return the entire string output ("Jan Muller").

In some cases, functions can invoke or otherwise access other functions, or otherwise be combined to form more complex functions.

Example 13—Example Classifiers

In any of the examples herein, a classifier can include an algorithm, such as an analytical algorithm, heuristic algorithm, and/or a machine-learning algorithm, one or more classification criteria, parameters, or other classification logic. A classifier can have a name or other classifier identifier, and can be defined, at least in part, by a set of input arguments having respective types (e.g. data types) and a set of output arguments having respective types (e.g. data types). A classifier generally performs classification or classification analysis on a data set, generally based on one or more criteria for the data set or traits of the data set.

Generally, a classifier can include executable code which can be invoked by a function call, a method call, a service or microservice call, or otherwise be initiated.

Example 14—Example Triggers for Automatic or Semi-Automatic Transformation Rule Generation In any of the examples herein, a trigger can indicate or initiate execution of transformation rule generation and/or evaluation functionality, as described herein. A trigger generally initiates transformation rule generation and/or evaluation in response to the trigger. For example, entering a new complete transformation rule can trigger evaluation of the rule. As another example, completing a mapping, such as in a user interface, can trigger transformation rule generation, which can include evaluation of the transformation rules in some cases.

Example 15—Example Transformation Rules in ETL Processes

In any of the examples herein, the transformation rules can be applied in an extract-transform-load (ETL) process. Generally, a target or final transformation rule can be selected and associated with a mapping in an alignment. Generally, each mapping in an alignment can have a transformation rule associated with it, generated as described herein. An ETL process between a source database and a target database can include extracting instance data (e.g. records) from the source database, transforming the instance data to match the schema of the target database, and loading or otherwise storing the transformed instance data into the target database. An alignment having mappings and associated transformation rules, generated as described herein, can be used in the transformation step of the ETL process. For example, the mappings define what fields in the source database should be transferred to which fields in the target database. Further, a transformation rule can provide the functionality (logic and/or operations, etc.) necessary to convert the source data from the source database into the format, structure, or other appropriate value(s) of the corresponding field(s) in the target database. In this way, the transformation rule generation and evaluation functionality, as described herein, can facilitate ETL processes. For example, the transformation rule generation and evaluation functionality can efficiently (e.g. often faster and more accurately than traditional methods) generate transformation rules for use in transformation of extracted data in ETL processes.

Example 16—Transformation Rule Engine Module Environments

Figure 6A:
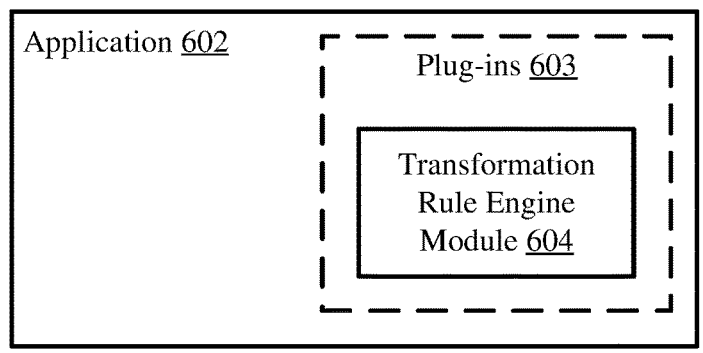
FIG. 6A is an exemplary application environment for a transformation rule engine module.

FIG. 6A is a schematic diagram depicting an application environment for a transformation rule engine module 604, which may provide transformation rule generation and/or evaluation functionality, as described herein. An application 602, such as a software application running in a computing environment, may have one or more plug-ins 603 (or add-ins or other software extensions to programs) that add functionality to, or otherwise enhance, the application. The transformation rule engine module 604 may be integrated with the application 602; for example, the transformation rule engine module may be integrated as a plug-in. The transformation rule engine module 604 may add functionality to the application 602 for transformation rule generation and/or evaluation functionality, which may be displayed in a user interface or otherwise provided to a user. For example, the application 602 may be a database or data modeling application, or a database management application, and the transformation rule engine module 604 may be integrated with the database or data management application to provide transformation rule generation and/or evaluation functionality, as described herein.

Figure 6B:
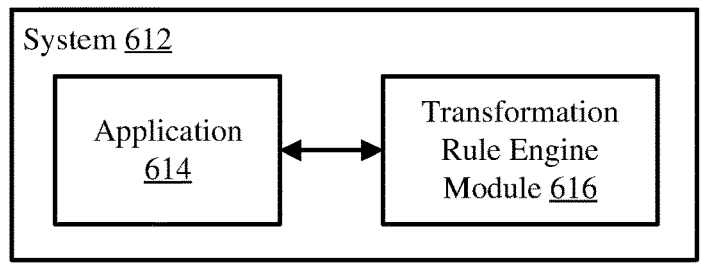
FIG. 6B is an exemplary system environment for a transformation rule engine module.

FIG. 6B is a schematic diagram depicting a system environment for a transformation rule engine module 616, which may provide transformation rule generation and/or evaluation functionality as described herein. The transformation rule engine module 616 may be integrated with a computer system 612. The computer system 612 may include an operating system, or otherwise be a software platform, and the transformation rule engine module 616 may be an application or service running in the operating system or platform, or the transformation rule engine module may be integrated within the operating system or platform as a service or functionality provided through the operating system or platform. The system 612 may be a server or other networked computer or file system. Additionally or alternatively, the transformation rule engine module 616 may communicate with and provide transformation rule generation and/or evaluation functionality as described herein, to one or more applications 614, such as a database, data modeling, or database management applications, in the system 612.

Figure 6C:
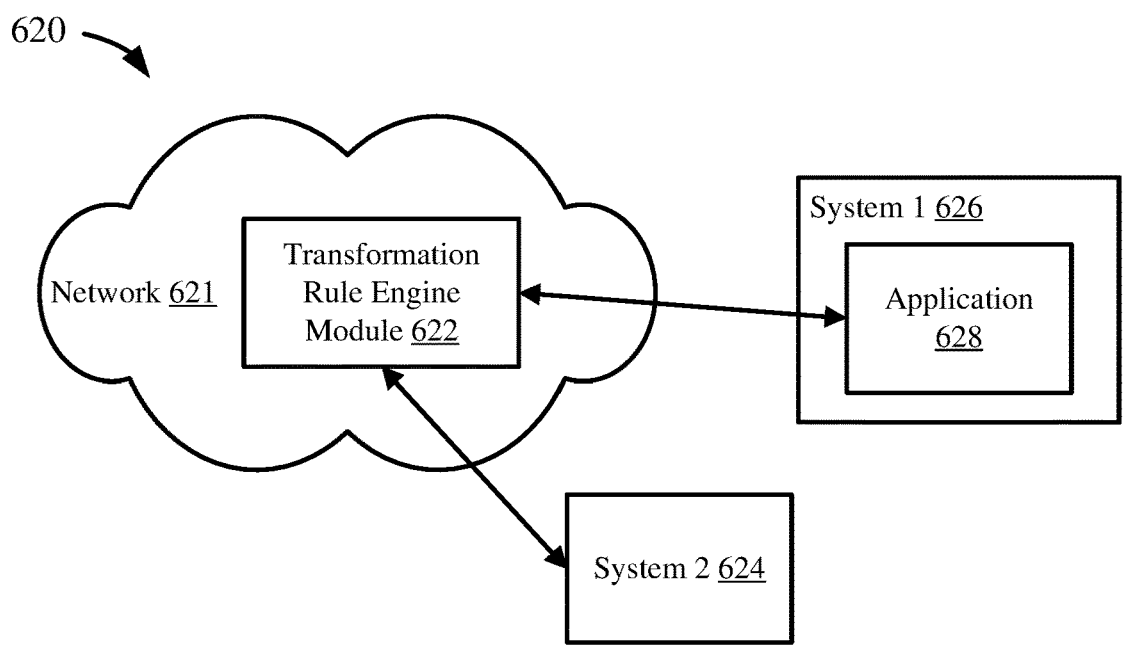
FIG. 6C is an exemplary network environment for a transformation rule engine module.

FIG. 6C is a schematic diagram depicting a network environment 620 for a transformation rule engine module 622, which may provide transformation rule generation and/or evaluation functionality, as described herein. The transformation rule engine module 622 may be available on a network 621, or integrated with a system (such as from FIG. 6B) on a network. Such a network 621 may be a cloud network or a local network. The rule engine module 622 may be available as a service to other systems on the network 621 or that have access to the network (e.g., may be on-demand software or SaaS). For example, system 2 624 may be part of, or have access to, the network 621, and so can utilize transformation rule generation and/or evaluation functionality from the transformation rule engine module 622. Additionally, system 1 626, which may be part of or have access to the network 621, may have one or more applications, such as application 628, that may utilize transformation rule generation and/or evaluation functionality, or other rule generation or evaluation functionality, from the transformation rule engine module 622.

In these ways, the transformation rule engine module 604, 616, 622 may be integrated into an application, a system, or a network, to provide transformation rule generation and/or evaluation functionality, or other rule generation or evaluation functionality, as described herein.

Example 17—Computing Systems

Figure 7:
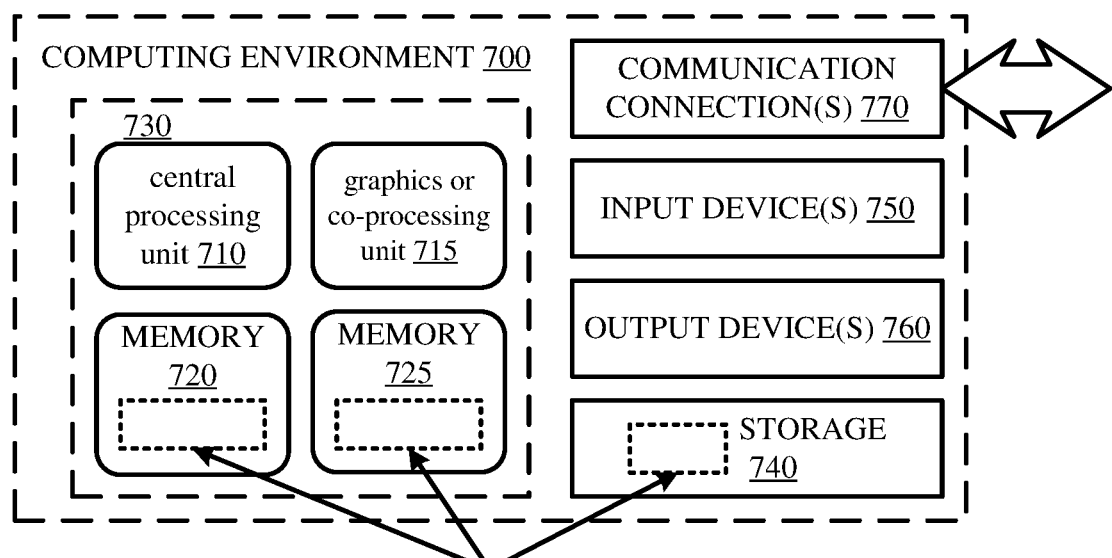
FIG. 7 is a diagram of an example computing system in which described embodiments can be implemented.

FIG. 7 depicts a generalized example of a suitable computing system 700 in which the described innovations may be implemented. The computing system 700 is not intended to suggest any limitation as to scope of use or functionality of the present disclosure, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions, such as for implementing components of the processes of FIGS. 3A-C, the systems of FIGS. 1A-B and 6A-C, or the data, data representations, or data structures of FIGS. 2 and 4A-C, and the displays and examples of FIGS. 5A-B. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s) 710, 715. The memory 720, 725 stores software 780 implementing one or more innovations described herein, in the form of computer-executable instructions suitable for execution by the processing unit(s) 710, 715. The memory 720, 725, may also store settings or settings characteristics, databases, data sets, rule sets, interfaces, displays, or examples shown in FIGS. 2, 4A-C, and 5A-B, the systems shown in FIGS. 1A-B and 6A-C, or the steps of the processes shown in FIGS. 3A-C.

A computing system 700 may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 18—Cloud Computing Environment

Figure 8:
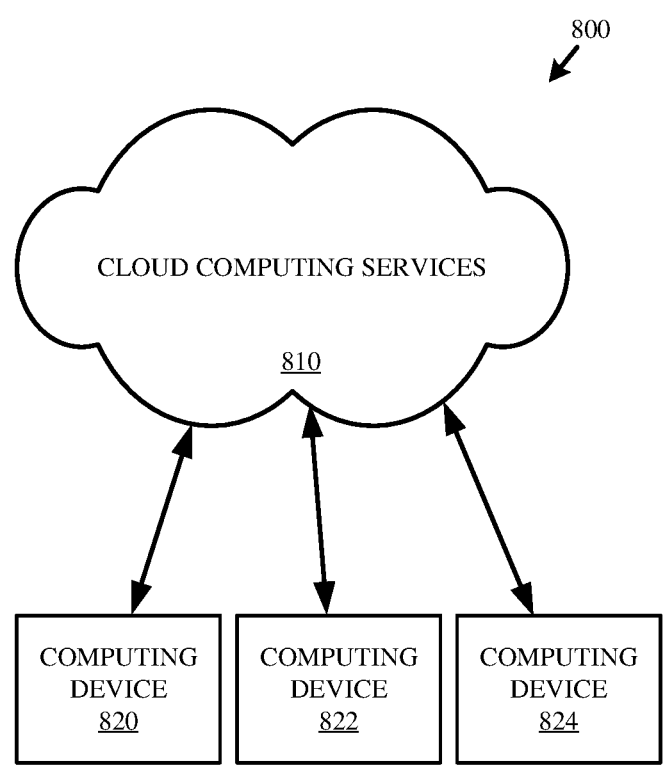
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operations (e.g., data processing, data storage, and the like).

Example 19—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (i.e., any available computing device, including smart phones or other mobile devices that include computing hardware). Tangible computer-readable storage media are any available tangible media that can be accessed within a computing environment (one or more optical media discs such as DVD or CD, volatile memory (such as DRAM or SRAM), or nonvolatile memory (such as flash memory or hard drives)). By way of example, and with reference to FIG. 7, computer-readable storage media include memory 720 and 725, and storage 740. The term computer-readable storage media does not include signals and carrier waves. In addition, the term computer-readable storage media does not include communication connections (e.g., 770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

Example 20—Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, comprising:
   receiving a mapping comprising one or more source fields in a source database and a target field in a target database;
   identifying one or more transformation functions;
   generating one or more transformation rules based on the one or more source fields, the target field, and the one or more transformation functions;
   evaluating the one or more transformation rules to generate evaluation results, wherein evaluating the one or more transformation rules comprises identifying one or more classifiers and executing the classifiers against the transformation rules, wherein executing the classifiers against the transformation rules comprises generating test data for the respective one or more transformation rules and evaluating the test data based on target instance data of the target database, and wherein generating the test data comprises executing the one or more transformation rules via source instance data of the source database to generate respective sets of test data for the respective one or more transformation rules;
   selecting a target transformation rule from the one or more transformation rules based on the evaluation results;
   associating the selected target transformation rule with the mapping; and
   providing the evaluation results along with the one or more generated transformation rules.

2. The method of claim 1, further comprising:
   associating a selected transformation rule of the one or more transformation rules with the mapping; and
   performing an ETL process via the selected transformation rule.

3. The method of claim 2, wherein performing the ETL process comprises:
   extracting the source instance data from the source database;
   transforming the source instance data via the selected transformation rule; and
   storing the transformed instance data in the target database.

4. The method of claim 1, wherein generating the one or more transformation rules comprises generating one or more subrules based on a subset of the one or more source fields and one or more transformation functions, and wherein at least one of the one or more transformation rules is based on the one or more subrules.

5. The method of claim 1, wherein generating the one or more transformation rules comprises generating transformation rules for different combinations of the one or more source fields and the identified transformation functions.

6. The method of claim 1, wherein evaluating the test data comprises obtaining the target instance data of the target database, training a machine-learning algorithm of the classifier via the target instance data and the test data, and executing the trained machine-learning algorithm of the classifier via the test data to generate the evaluation results.

7. The method of claim 1, further comprising:
filtering the one or more identified transformation functions, wherein filtering comprises removing at least one transformation functions.

8. The method of claim 7, wherein the one or more identified transformation functions are filtered based on compatibility with the one or more source fields and the target field.

9. The method of claim 1, further comprising:
displaying the one or more transformation rules.

10. The method of claim 9, further comprising:
displaying one or more evaluation results of the one or more transformation rules.

11. The method of claim 9, further comprising:
receiving a selection of a target transformation rule from the one or more displayed transformation rules; and
associating the selected target transformation rule with the mapping.

12. The method of claim 1, wherein the one or more transformation rules receive the one or more source fields as input, executing one or more operations on the one or more source fields, and output a transformed field.

13. The method of claim 1, further comprising:
storing the one or more transformation rules in association with the mapping.

14. One or more non-transitory computer-readable storage media storing computer-executable instructions for causing a computing system to perform a method, the method comprising:
receiving an alignment between a source database and a target database, wherein the alignment comprises one or more mappings respectively comprising one or more source fields in the source database and a target field in the target database;
identifying one or more transformation function filters;
for the respective one or more mappings, identifying one or more transformation functions, based on the one or more transformation function filters, applicable to the respective mappings;
for the respective one or more mappings, generating one or more sets of transformation rules based on the respective one or more source fields, the respective target field, and the respective one or more transformation functions;
for the respective one or more mappings, identifying one or more classifiers;
for the respective one or more mappings, evaluating the respective sets of transformation rules by executing the one or more classifiers based on source instance data from the source database, target instance data from the target database, and test data generated via the transformation rules, wherein executing the one or more classifiers comprises generating the test data for the one or more sets of transformation rules and evaluating the test data based on the target instance data from the target database, and wherein generating the test data comprises executing the one or more sets of transformation rules via the source instance data from the source database to generate respective sets of test data for the one or more sets of transformation rules;
for the respective one or more mappings, selecting respective target transformation rules from the one or more transformation rules based on their respective evaluation results from the evaluating;
associating the selected target transformation rules with the respective one or more mappings; and
providing the one or more sets of generated transformation rules in association with their respective evaluation results.

15. The one or more non-transitory computer-readable storage media of claim 14, wherein the one or more transformation function filters comprise one of pre-generated, standard, or customized filters.

16. A system comprising:
one or more memories;
one or more processing units coupled to the one or more memories; and
one or more computer-readable storage media storing instructions that, when loaded into the one or more memories, cause the one or more processing units to perform operations comprising:
receiving an alignment between a source database and a target database, wherein the alignment comprises one or more mappings respectively comprising one or more source fields in the source database and a target field in the target database;
identifying one or more transformation function filters;
identifying one or more transformation functions, based on the one or more transformation function filters, applicable to a given mapping of the one or more mappings of the alignment;
generating a set of transformation rules based on the one or more source fields of the given mapping, the target field of the given mapping, and the one or more identified transformation functions, wherein generating the set of transformation rules comprises generating rules for respective combinations of the one or more source fields and the one or more identified transformation functions;
identifying one or more transformation rule classifiers applicable to the given mapping of the one or more mappings of the alignment, wherein the transformation rule classifiers are machine-learning classification algorithms;
evaluating the set of transformation rules via executing the one or more transformation rule classifiers based on source instance data from the source database, target instance data from the target database, and test data generated, against the transformation rules, wherein executing the one or more transformation rule classifiers against the set of transformation rules comprises generating test data for the set of transformation rules and evaluating the test data based on the target instance data from the target database, wherein generating the test data comprises executing the set of transformation rules via the source instance data from the source database to generate the test data for the set of transformation rules, and wherein the evaluating comprises generating respective confidence scores for the respective rules in the set of transformation rules;
selecting respective target transformation rules from the set of transformation rules based on their respective confidence scores;

associating the selected target transformation rules with the given mapping of the one or more mappings; and providing the set of generated transformation rules in association with their respective confidence scores.

17. The system of claim 16, wherein the one or more transformation function filters comprise one of pre-generated, standard, or customized filters.

* * * * *